United States Patent

Holt

[15] 3,651,461

[45] Mar. 21, 1972

[54] CENTER REFERENCED CHARACTER IDENTIFICATION

[72] Inventor: Arthur W. Holt, Annapolis, Md.

[73] Assignee: Recognition Equipment Incorporated, Irving, Tex.

[22] Filed: Apr. 17, 1970

[21] Appl. No.: 29,485

[52] U.S. Cl. ....................340/146.3AC

[51] Int. Cl. ....................G06k 9/10

[58] Field of Search ...........340/146.3 A, 146.3 AE, 146.3 B, 340/146.3 R

[56] References Cited

UNITED STATES PATENTS

| | | | |
|---|---|---|---|
| 3,407,386 | 10/1968 | Spanjersberg | 340/146.3 |
| 3,500,323 | 3/1970 | Funk et al. | 340/146.3 |
| 3,346,845 | 10/1967 | Fomenko | 340/146.3 |

*Primary Examiner*—Thomas A. Robinson
*Attorney*—Richards, Harris & Hubbard

[57] ABSTRACT

Printed characters, superimposed upon a contrasting center bar extending through a character field, are identified by scanning each character along a plurality of vertically aligned laterally spaced paths to generate character signals dependent upon encountering a character portion. The center bar is sensed to generate a control signal. In response to the character signal and the control signal an output signal is produced. In a preferred mode for alphanumeric characters white signals and black signals representative of white and black fields at each of a plurality of points along each said path are generated. The signal from each given point is compared with signals representing points immediately above, immediately below and next most remote, with reference to the center bar, to modify the signal from the given point and thereby generate enclosed point signals when any white field is within a boundary formed by a black character portion and the said center bar. The enclosed point signals for a plurality of separate zones of said field are compared with a code for each symbol to produce character identification signals. The number of crossings of the center bar, projection signals dependent upon the projections onto the center bar, and crossing signals representative of the number of crossings by the character of a vertical line spaced to one side of the center bar are selectively employed.

25 Claims, 14 Drawing Figures

INVENTOR
ARTHUR W. HOLT

Richards, Harris & Hubbard
ATTORNEYS

INVENTOR
ARTHUR W. HOLT

Richards, Harris & Hubbard
ATTORNEYS

INVENTOR:
ARTHUR W. HOLT

Richards, Harris & Hubbard
ATTORNEYS

INVENTOR:
ARTHUR W. HOLT

Richards, Harris & Hubbard
ATTORNEYS

INVENTOR:
ARTHUR W. HOLT

Richards, Harris & Hubbard
ATTORNEYS

INVENTOR:
ARTHUR W. HOLT

Richards, Harris & Hubbard
ATTORNEYS

INVENTOR:
ARTHUR W. HOLT

Richards, Harris & Hubbard
ATTORNEYS

CENTER REFERENCED CHARACTER IDENTIFICATION

This invention relates to automatic identification of printed characters, and more particularly to the sensing of areas in each of a plurality of fields within a boundary formed by the character and a center bar, by effectively relating the character to the center bar. Enclosed point signals in one aspect are generated for comparison with a predetermined code. In other aspects, the number of character crossings of the center bar, the projection of the character to the center bar, and the number of crossings of a line spaced laterally from the center bar are employed.

The wide variety with which a given character may be executed has led to restriction in execution on documents designed to be employed in automatic readers. In magnetic ink character recognition systems, certain zones of the character have well defined areas of varying proportions covered by magnetic materials in order to produce distinctive features in signals generated as the characters pass a magnetic reading station. In systems where handprinted characters are to be employed, it has been found desirable to impose constraints upon the form of execution in order that the mechanism employed in identification may be greatly simplified.

The present invention relates to signal identification of constrained characters which are center justified with a vertical center bar extending through the field on which the character reposes. By way of example, the field may be divided into four portions, the division points being defined by the vertical bar and by a horizontal bar extending across the field at a point dependent upon the character itself. The presence or absence of areas enclosed by the boundary formed by contours of the character and the center bar in each of the four portions permits use of a four bit code to identify characters up to 16 in number. Other features may also be employed to increase the number of characters that may be accommodated or to simplify operations all referenced to the center bar.

In accordance with one mode of carrying out the present invention, characters executed substantially in accordance with a predetermined format and center justified relative to a vertical bar are scanned serially while moving past a reading station to produce enclosed point code signals which are compared with a stored code to produce an output signal upon coincidence during comparison. Preferably each character is scanned along a plurality of vertically aligned laterally spaced paths as it passes the reading station. A white signal or a black signal, representative of white and black fields as viewed by the scanner, are generated at each of a plurality of points along each path. The signal for each point is compared sequentially with signals representing points immediately above, immediately below and next most remote from the center line to modify the signal from each given point to produce a unique enclosed point signal when any white field is found to be enclosed by a boundary formed by the black character portions and the center line. The enclosed point signals are then compared with a stored code to produce symbol identification signals.

In accordance with a further aspect, the code and the signals compared therewith may be modified in dependence upon the number of crossings on the center bar by the character. Further, the code and the signals compared therewith may be modified by projection signals dependent upon the projection onto the center bar of at least one of a right half portion and a left half portion of each character. Further, the ratio of the projections of two separate portions may be employed to modify the code and signals compared therewith. Finally, they may be modified in dependence upon the number of crossings by the character of a vertical line spaced to one side of the center bar.

For a more complete understanding of the present invention and for further objects and advantages thereof, reference may now be had to the following description taken in conjunction with the accompanying drawings in which.

FIGURE 1

Figure 1:
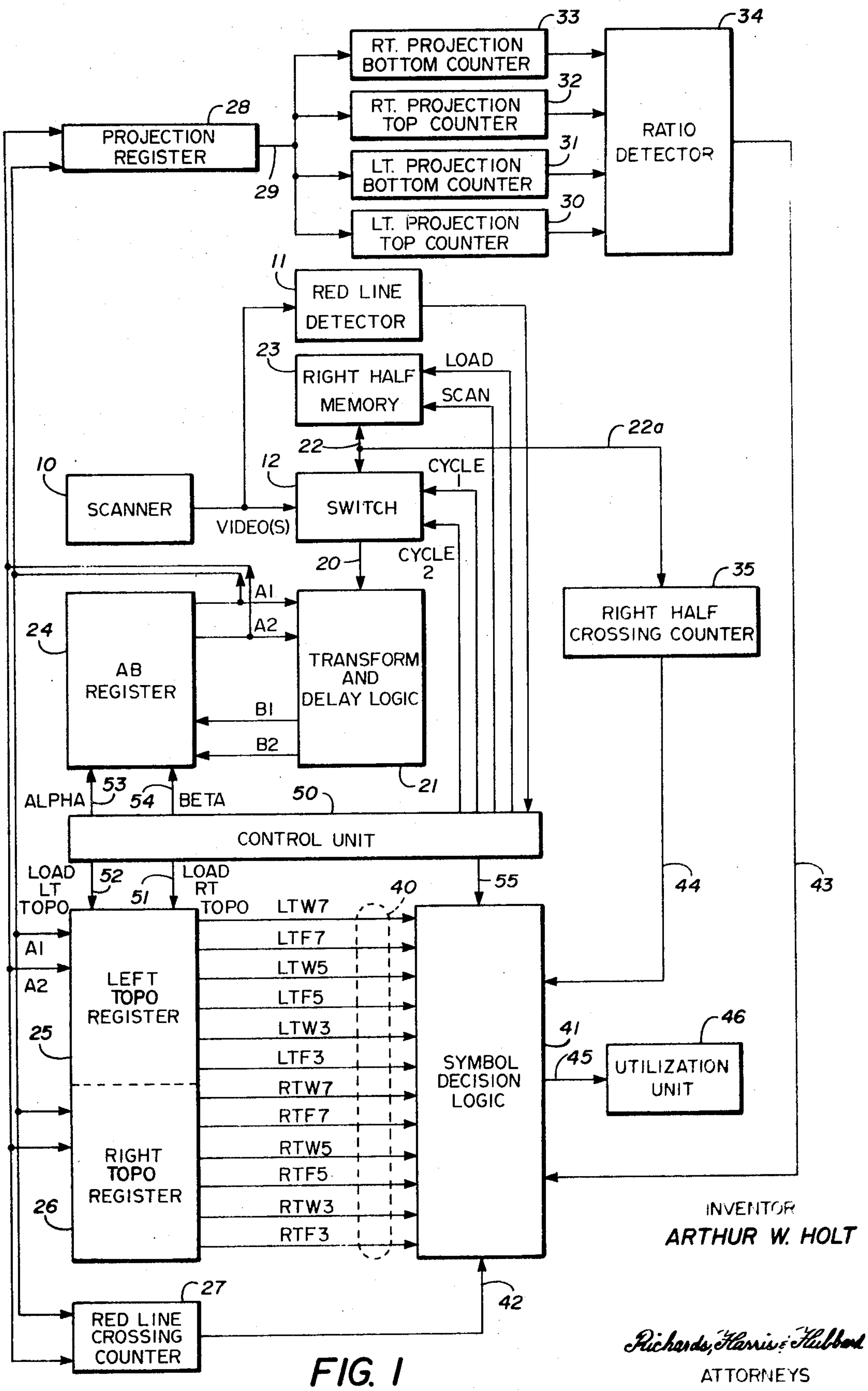
FIG. 1 is a block diagram of one system embodying the invention.

The invention will be described in connection with one embodiment illustrated schematically in FIG. 1. Documents which continuously move past a scanning station will be repeatedly scanned along laterally spaced vertical paths by a scanner 10. Scanner 10 produces video signals which are applied to a red line detector 11 and to a switch 12. Because the document moves, the scan paths are spaced apart in the direction of movement, the spacings being dependent upon document speed and the scan period. Thus, the scanning cycle first encounters a symbol in a given field at the left edge of the symbol. Scanner 10 will execute a few vertical scans before encountering the left edge of the symbol. In the embodiment here described from 10 to 30 vertical scans were employed for each half character field.

Scanner 10 may comprise a rotating disk with equally spaced holes located at a common radius which is large compared with character height. Light reflected from the document passes through the holes in the disk and via a suitable optical system onto a photocell. Such scanners are well understood. Alternatively, the scanner may comprise a single column of photocells whose elements are gated sequentially to scan the document vertically.

In either event, the output signal from the scanner is gated into a logic system by having multiple storage for each column scanned. In the present embodiment 48 samples were obtained per column.

The principal mode of operation involves processing the signals from each column in the sequence of the columns to identify the existence of areas which are enclosed within a boundary formed by a character loop and the center bar. More particularly, referring to FIG. 2, center bar 13 passes through the numeral 2. The upper right hand character portion 14 and the vertical bar 13 enclose an area. The upper left hand character portion 15 does not enclose an area. A lower left hand portion 16 and the vertical bar 13 enclose an area. The lower right hand portion 17 does not enclose an area.

The object is to process the signals produced by gating the photocell output, 48 samples per scan, to identify portions above and below center bar crossings which have enclosed areas and the portions which do not have enclosed areas. Thus, four bits of information are provided. This information forms a four bit code, capable of identifying up to 16 characters. The present example will assume that only the numerals 0–9 are to be identified. Additions to the system will then be described, all shown in FIG. 1, which extend the system capability beyond 16 symbols.

Returning now to FIG. 1, during control cycle 1 the switch 12 connects sensor 10 to a transform and delay logic unit 21 by way of path 20 and during control cycle 2 by way of line 22 to a right half memory unit 23. Signal channels B1 and B2 lead from logic unit 21 to an AB register 24. Signal channels A1 and A2 lead from register 24 to the transform unit 21 as well as to a left topo register 25, a right topo register 26 and to a red line crossing counter 27.

Lines A1 and A2 also extend to a projection register 28. The output channel 29 from register 28 is connected to four units, a left projection top counter 30, a left projection bottom counter 31, a right projection top counter 32 and a right projection bottom counter 33. Counters 30–33 are connected to a plurality of ratio detectors 34.

Switch 12 is connected by way of path 22*a* to a right half crossing counter 35. A set 40 of signal channels lead from registers 25 and 26 to a symbol decision logic unit 41. Path 42 leads from counter 27 to logic unit 41. Path 43 leads from ratio detectors 34 to unit 41. Path 44 leads from counter 35 to unit 41. A set 45 of decision output channels extend from the decision logic 41 to a utilization unit 46 which may be a storage unit or a printer or the like which receives the output signals on lines 45, one signal for each symbol passing scanner 10.

A control unit 50 is connected to the various units thus far described to control the sequence of operations as hereinafter to be described.

Right half memory unit 23 is provided in order to store signals produced as a right half of a symbol is scanned, it being necessary to store the right half signals in order to process them in unit 21 sequentially from the right side of the character to the center bar. In contrast, the left half signals can be processed directly by unit 21 as the scanning progresses because in the left half cycle the symbol is scanned from the left side to the center bar.

AB register 24 is a 48 byte, two bits per byte, addressable storage unit. The right half memory unit 23 in one embodiment comprises 768 bits of random access memory. The units operate in cooperation to collapse the left half of each symbol to the center line and then to collapse the right half to the center line. At the end of the left half cycle the signals in storage in AB register 24 are dumped into register 25 and at the end of the right half cycle the signals in register 24 are dumped into register 26. The operation in registers 25 and 26 serve to produce a unique combination of signals on lines 40 which are used in unit 41 to energize one of lines 45 for each symbol passing scanner 10.

OPERATION

Scanner 10 applies video digital data to switch 12. The scanning of each symbol is divided into two parts, cycle 1 and cycle 2. Cycle 1 starts at the left of the character field and stops when the character is approximately half scanned in the sequence of from left to right, terminating when the center bar is detected. Cycle 1 data is fed directly into logic 21. The object of cycle 1 is effectively to collapse the topology of the left side of the character horizontally and "map it" onto the center bar and to leave in register 24 signals which define upper and lower limits of areas enclosed by the boundary formed by a character portion and the center bar.

Cycle 2 begins at the end of cycle 1. Cycle 2 data is loaded into memory 23 as the scan process proceeds beyond the center bar toward the right hand margin of the character. Data thus stored will then be read out of storage in reverse order, from the right side back to the center bar and applied to transform unit 21 to produce a like set of data in register 24.

As above noted, logic unit 21 functions to determine if any white points are bounded by a black line and the center bar. Enclosed point and nonenclosed point signals are stored in the register 24. When the scanner senses the center bar in cycle 1, the contents of AB register are dumped into register 25 by way of paths A1 and A2. Likewise, after right half cycle signals from memory 23 pass through logic 21 in cycle 2, the contents of register 24 are dumped into the register 26 via paths A1 and A2.

Following the end of cycle 2, the registers 25 and 26 are allowed to drive logic 41 where the signals are compared with a stored code to produce a signal on one of lines 45 indicative of the character being scanned.

Control unit 50 sequences the above steps. Control lines 51 and 52 extend from unit 50 to registers 25 and 26. Lines 53 and 54 extend to register 24. Line 55 extends to logic 41. The control lines are indicated only in a gross sense in FIG. 1 and will be detailed in connection with FIGS. 4–11.

Signals produced by each vertical scan are processed in two phases, alpha and beta. The alpha phase comprises the time interval occupied by each downward scan. At the end of the initial downward scan, the alpha phase terminates and the beta phase begins and is completed before the next downward scan begins. Alpha and beta phases alternate until the center bar is detected at which time the signals stored in the register 24 are transferred into the register 25 clearing the register 24 for cycle 2.

As above noted, register 24 is a two bit per byte, 48 byte unit. The following symbols and abbreviations will be used herein to define the basic logical rules employed in register 24:

K = a black point;

W = a white point which is connected to white areas not completely bounded by black points and the center bar;

P = a white point possibly bounded by black points and the center bar; and

F = a white point completely bounded by black points and the center bar.

Figure 2:
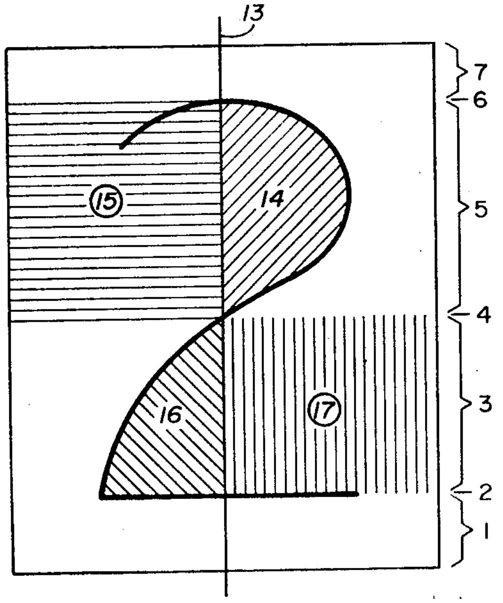
FIG. 2 illustrates execution and analysis of a 2 in accordance with the invention.

By mapping the left side of the numeral 2, FIG. 2, onto the center bar in accordance with the foregoing nomenclature, area 15 will be designated W and the area 16 designated F.

Similarly, during cycle 2, as the right side of the numeral 2 is mapped onto the center bar, area 14 is designated F and the area 17 is designated W.

Figure 3:
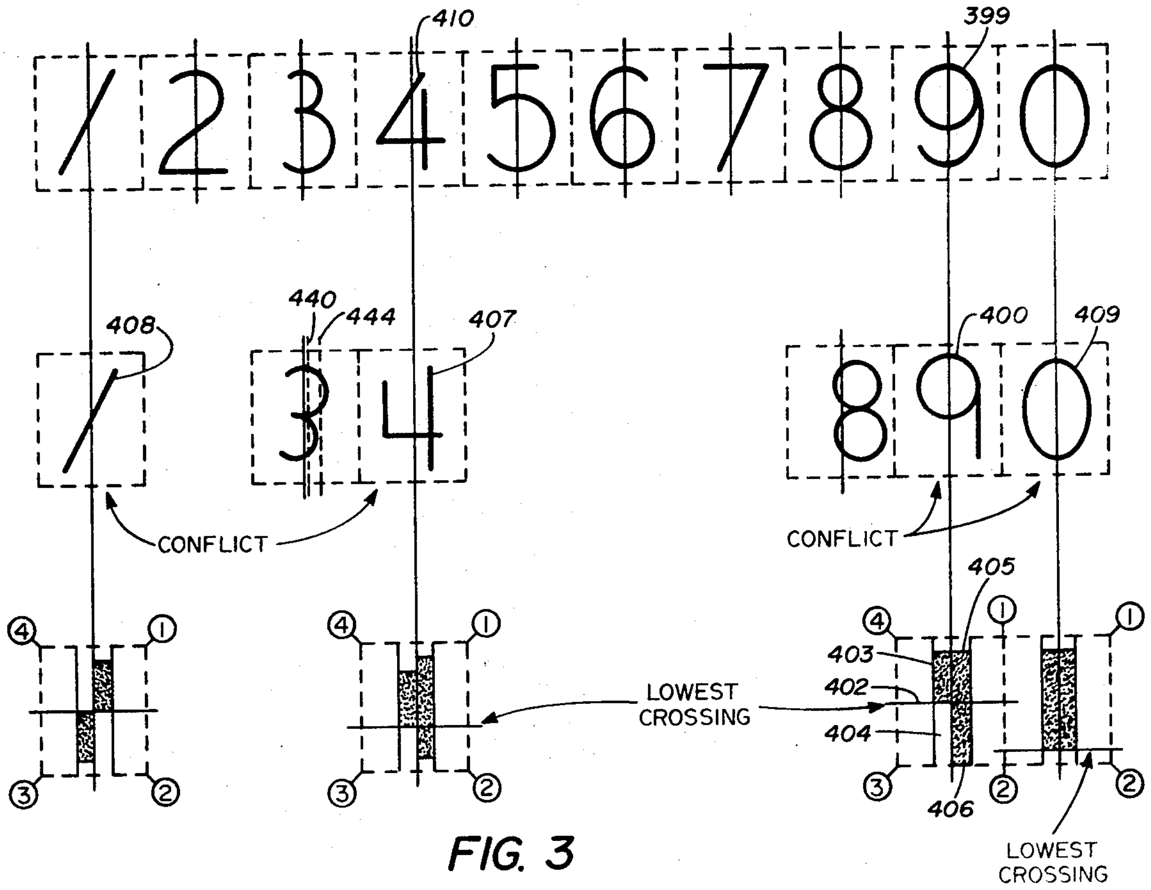
FIG. 3 illustrates a set of constrained center justified numerals 0–9.

FIG. 3 illustrates the symbol set 0–9 constrained as to center bar justified.

The results of mapping such constrained symbols onto a vertical center line can be reduced to a code in which a 1 means that an enclosed area is present and a 0 means that no enclosed area is present taking into account that numeral 1, FIG. 3, involves only one center crossing, numerals 4, 7 and 0 involve two center crossings and the remainder involve three center crossings. One code for the set 0–9 executed as in FIG. 3 is shown in Table I:

TABLE I

| 0 | | 1 | | 2 | | 3 | | 4 | | 5 | | 6 | | 7 | | 8 | | 9 | |
|---|---|---|---|---|---|---|---|---|---|---|---|---|---|---|---|---|---|---|---|
| 1 | 1 | 0 | 0 | 0 | 1 | 0 | 1 | 1 | 0 | 1 | 0 | 1 | 0 | 0 | 1 | 1 | 1 | 1 | 1 |
| | | | | 1 | 0 | 0 | 1 | | | 0 | 1 | 1 | 1 | | | 1 | 1 | 0 | 1 |

In accordance with the invention, the code of Table I is wired into, and thus is stored in logic unit 41.

In order to obtain enclosed point signals, it is necessary to perform signal transformations in unit 21. This is because scan output signals on line 20 are of a one bit code and are either a 0 or a 1, where:

1 = photocell registration with a black area; and

0 = photocell registration with a white area.

The one bit coded data is transformed within a two bit code in unit 21. Signals in the two bit code are:

11 = K = a black point;

10 = W = a white point not bounded remotely with reference to the center bar by a black line and above by a black point;

01 = P = a white point which is possibly enclosed as indicated by the presence of a black point remotely with reference to the center bar and a black point above; and 00 = F = an enclosed point, i.e., a white point enclosed by a black point remotely with reference to the center bar and a black point both above and below.

Table II sets forth seven possible conditions encountered during the alpha phase of processing signals from each scan and the resulting transform.

TABLE II

| | Current Point | Point Above | Point Next Remote | Resulting Transform |
|---|---|---|---|---|
| *a* | 1 | * | * | K (11) |
| *b* | 0 | * | W | W (10) |
| *c* | 0 | W | * | W (10) |
| *d* | 0 | K | K | P (01) |
| *e* | 0 | P | K | P (01) |
| *f* | 0 | K | F | P (01) |
| *g* | 0 | P | F | P (01) |

*Immaterial

More particularly, from Table II, line *a*, the current point is a 1 signifying that the photocell sees a black point. In this case the black 1 or white 0 nature of the point above or the point next remote is immaterial (*). The transformation result is the two bit code representing a K 11. In line *b*, the photocell sees a white zone. The point next remote with reference to the center bar is a nonenclosed white point, therefore the transformation is to a nonenclosed white, i.e., to white = 10. In line *c* the same result obtains where the point above is a nonenclosed white. However, in line *d* where the photocell sees a white point with a point above and the point remote both black, then the transformation is to a code 01 indicating the presence of a possible enclosed zone. Thus, in lines *d–g*, the conditions encountered cause a transformation to P = 01, indicating the possibility of an enclosed point.

The results of the transformation during alpha phase indicated in Table II are stored in register 24. During beta phase, the stored signals are again applied to the transformation and delay logic 21 by channels A1 and A2 to complete the transformation to the two bit code.

In Table III, data is illustrated where during the beta phase a reverse scan is employed to compare the current point with the point below.

TABLE III

| | Current Point | Point Below | Transformation Result |
|---|---|---|---|
| *a* | K | * | K (11) |
| *b* | P | K | F (00) |
| *c* | P | F | F (00) |
| *d* | W | * | W (10) |
| *e* | P | W | W (10) |

In line *a*, Table III, with the current point a black point, it is immaterial as to whether or not the point below is black or white. There is no transformation. In lines *b* and *c*, the current point is a possibly enclosed point. If the point below is either a black point or an enclosed white point, then there will be a transformation to an F signal representing an enclosed zone. On lines *d* and *e* where the current point is a nonenclosed white point, or a possibly enclosed white point bounded below by a nonenclosed white point, there will be no transformation.

The transformed signals stored in the register 24 are rewritten or replaced for each vertical scan of the symbol field with progressive change of the signals as the scan proceeds toward the center bar to carry forward a code indicating the existence and the vertical extent or height of an enclosed area and its location along the vertical scale.

In processing data produced by scanning the numeral 2, FIGS. 2 and 3, the alpha and beta phase operations are shown in Tables IV, V and VI. Table IV illustrates the input on path 20, FIG. 1.

TABLE IV

| Column | 1 | 2 | 3 | 4 | 5 | 6 | 13 | 12 | 11 | 10 | 9 | 8 | 7 |
|---|---|---|---|---|---|---|---|---|---|---|---|---|---|
| Row 1 | 0 | 0 | 0 | 1 | 1 | 0 | 0 | 0 | 0 | 0 | 0 | 0 | 0 |
| Row 2 | 0 | 0 | 1 | 1 | 1 | 1 | 0 | 0 | 0 | 0 | 0 | 1 | 1 |
| Row 3 | 0 | 1 | 0 | 0 | 0 | 0 | 0 | 0 | 0 | 1 | 1 | 0 | 0 |
| Row 4 | 0 | 1 | 0 | 0 | 0 | 0 | 0 | 0 | 1 | 0 | 0 | 0 | 0 |
| Row 5 | 0 | 0 | 0 | 0 | 0 | 0 | 0 | 0 | 1 | 1 | 0 | 0 | 0 |
| Row 6 | 0 | 0 | 0 | 0 | 0 | 0 | 0 | 0 | 0 | 0 | 1 | 1 | 1 |
| Row 7 | 0 | 0 | 0 | 0 | 0 | 1 | 0 | 0 | 0 | 0 | 0 | 0 | 1 |
| Row 8 | 0 | 0 | 0 | 1 | 1 | 0 | 0 | 0 | 0 | 0 | 0 | 0 | 0 |
| Row 9 | 0 | 0 | 1 | 1 | 0 | 0 | 0 | 0 | 0 | 0 | 0 | 0 | 0 |
| Row 10 | 0 | 0 | 1 | 0 | 0 | 0 | 0 | 0 | 0 | 0 | 1 | 1 | 0 |
| Row 11 | 0 | 0 | 0 | 1 | 1 | 1 | 0 | 1 | 1 | 1 | 0 | 0 | 1 |
| Row 12 | 0 | 0 | 0 | 0 | 0 | 0 | 0 | 0 | 0 | 0 | 0 | 0 | 0 |

Table V illustrates in each column thereof the results after the alpha phase for that column.

TABLE V

| Column | 1 | 2 | 3 | 4 | 5 | 6 | 13 | 12 | 11 | 10 | 9 | 8 | 7 |
|---|---|---|---|---|---|---|---|---|---|---|---|---|---|
| Row 1 | W | W | W | K | K | W | W | W | W | W | W | W | W |
| Row 2 | W | W | K | K | K | K | W | W | W | W | W | K | K |
| Row 3 | W | K | P | W | W | W | W | W | W | K | K | P | P |
| Row 4 | W | K | P | W | W | W | W | W | K | P | P | P | P |
| Row 5 | W | W | W | W | W | W | W | W | K | P | P | P | P |
| Row 6 | W | W | W | W | W | W | W | W | W | W | K | K | K |
| Row 7 | W | W | W | W | W | K | W | W | W | W | W | W | K |
| Row 8 | W | W | W | K | K | P | W | W | W | W | W | W | W |
| Row 9 | W | W | K | K | P | P | W | W | W | W | W | W | W |
| Row 10 | W | W | K | P | P | P | W | W | W | W | K | K | W |
| Row 11 | W | W | W | K | K | K | W | K | K | K | W | W | K |
| Row 12 | W | W | W | W | W | W | W | W | W | W | W | W | W |

Table VI represents in each column the results after the beta phase for that column.

TABLE VI

| Column | 1 | 2 | 3 | 4 | 5 | 6 | 13 | 12 | 11 | 10 | 9 | 8 | 7 |
|---|---|---|---|---|---|---|---|---|---|---|---|---|---|
| Row 1 | W | W | W | K | K | W | W | W | W | W | W | W | W |
| Row 2 | W | W | K | K | K | K | W | W | W | W | W | K | K |
| Row 3 | W | K | W | W | W | W | W | W | W | K | K | F | F |
| Row 4 | W | K | W | W | W | W | W | W | K | F | F | F | F |
| Row 5 | W | W | W | W | W | W | W | W | K | K | F | F | F |
| Row 6 | W | W | W | W | W | W | W | W | W | W | K | K | K |
| Row 7 | W | W | W | W | W | K | W | W | W | W | W | W | W |
| Row 8 | W | W | W | K | K | F | W | W | W | W | W | W | W |
| Row 9 | W | W | K | K | F | F | W | W | W | W | W | W | W |
| Row 10 | W | W | K | F | F | F | W | W | W | W | K | K | W |
| Row 11 | W | W | W | K | K | K | W | K | K | K | W | W | K |
| Row 12 | W | W | W | W | W | W | W | W | W | W | W | W | W |

It will be understood that the example of Tables IV–VI is based upon 12 points per column rather than 48 points per column as earlier described, the 12 point case being adopted solely to simplify the graphic example in the above tables. Thus, Table IV represents a simplified scan sequence of 13 successive columnar scans of the numeral 2 with 12 video outputs for each columnar scan. The video outputs are in the one bit code to represent a black 1 or white 0 output condition.

The data of Table IV is transformed one column at a time to data shown in Table V during the alpha phase for each column. The transformation is initially performed on rows 1–12 of column 1. For this transformation only, each of the 12 bit positions of column 1 is bounded to the left by a W bit. Therefore, in accordance with Table III, item *b*, each of the 12 bits of column 1 is transformed to the W state as shown in Table V for column 1.

The data of Table V is transformed to data shown in Table VI during the beta phase. The transformation is performed in the sequence beginning with row 12 and proceeding upward to row 1 of column 1. This is in the reverse direction from the alpha phase. According to Table III, item *d*, each of the column 1 bit positions remains in the W state shown in Table VI for column 1.

During the next alpha phase, column 2 transformations are performed sequentially for rows 1–12. Rows 1 and 2 are transformed to W as they are both bounded by a W point to the left. Rows 3 and 4 are not transformed to black K's 11 because black points 1 always remain black. Rows 5 through 12 are transformed to W as they are bounded by W points to the left. The second beta phase transformation for column 2 is then carried out in the sequence from row 12 to row 1. From examination, it will be seen that there will be no changes in this beta phase since all W and K points must remain W and K points.

The third alpha phase is then initiated to process column 3, rows 1–12. In row 1, the white 0 is transformed to W as it is bounded by a W point to the left. In row 2, the black 1 is transformed to a black K 11 as a black point remains black. In row 3, the white 0 is transformed to P 01 as it is bounded to the left by a black K and above by a black K. In row 4, the white 0 is transformed to a P 01 as it is bounded to the left by a black K and above by a P. Rows 5–8 are transformed sequentially to W's as they are each bounded to the left by W's. Rows 9 and 10 are transformed from a black 1 to a black K 11. Rows 11 and 12 are sequentially transformed to W's as they are both bounded to the left by W's.

In the beta phase for column 3, none of rows 12 through 5 are transformed as the W's remain W's and K's remain K's. The P of row 4 is transformed to a W as it is bounded below by a W. The P in row 3 is transformed to a W because it is now bounded by a W in row 4 following the transformation of row 4. The W's in rows 2 and 1 remain W's. Similarly, the video information derived from scanning columns 4, 5 and 6 are sequentially transformed during an alpha phase each followed by a beta phase. Following the transformation of column 6, the vertical center bar is detected and cycle 1 processing ended.

Detection of the vertical center bar initiates the start of cycle 2 processing. Columns 13–7 are scanned in that order and the video information stored in memory 23. Following the completion of the scanning of column 7, the memory reads out the stored information sequentially beginning with column 7. Both alpha and beta phase transformations are performed on columns 7–13 in that order.

At the completion of cycle 2 the mapping of the numeral 2 onto the center bar is completed with transformed columns 6 and 13 representing the results of such mapping. These results are further transformed into the code indicated in Table I, i.e., a 1 for an enclosed area and a 0 for a nonenclosed area by unit 41 to produce an output on one of lines 45 for each symbol.

The foregoing description has related primarily to symbol identification by collapsing the symbol topography to the center bar and identifying and coding enclosed areas in a four bit code. FIGS. 4–11 is a detailed logic diagram of a preferred embodiment of the invention. FIGS. 4–11 also detail means for providing three additional inputs to the decision logic 41, FIG. 1, namely the number of red line (center bar) crossings, the number of right half crossings and the magnitude of the projection ratios for certain areas. The latter features will be described in connection with FIGS. 4–11.

FIGS. 4–11 taken together form a composite drawing of a single system. In describing FIGS. 4–11, legends will be employed to designate the control signals as well as data. In order to assist in understanding the system, legends employed to designate the various functions are set out in the following table.

TABLE VII

| | |
|---|---|
| SOP1 | Slow Oscillator Phase 1 |
| SSOS | Start Scan One Shot |
| AROS | Address Register Clock |
| WDOS | write Delay One Shot |
| PRCL | Prime Clear |
| AP | Alpha Phase |
| BP | Beta Phase |
| GP | Gamma Phase |
| FOP1 | Fast Oscillator Phase 1 |
| WEOS | Write Enable One Shot |
| SFOS | Start Fast One Shot |
| WIAB | Write In AB |
| LHCY | Left Half Cycle |
| LTCY | Left Topo Cycle |
| RLPD | Red Line Presence detector |
| SVCY | Store Video Cycle |
| RHCY | Right Half Cycle |
| SRTC | Start Right Topo Cycle |
| RTCY | Right Topo Cycle |
| FOCY | Final Output Cycle |
| CS | Clear Scan |
| CLTR | Clear Left Topo Register |
| BCRL | Bottom Crossing Red Line |
| SVCY | Store Video Cycle |
| SVDA | Stpre Video Data |
| SSP | Start Scan Process |
| RLCH | Red Line Channel |
| SS | Start Scan |
| LOHO | |
| SPOS | |
| SLTR | Shift Left Topo Register |
| SRTR | Shift Right Topo Register |
| LTSE | Left Topo Shift Enable |
| RTSE | Right Topo Shift Enable |

FIGURES 4–11

Figure 4:
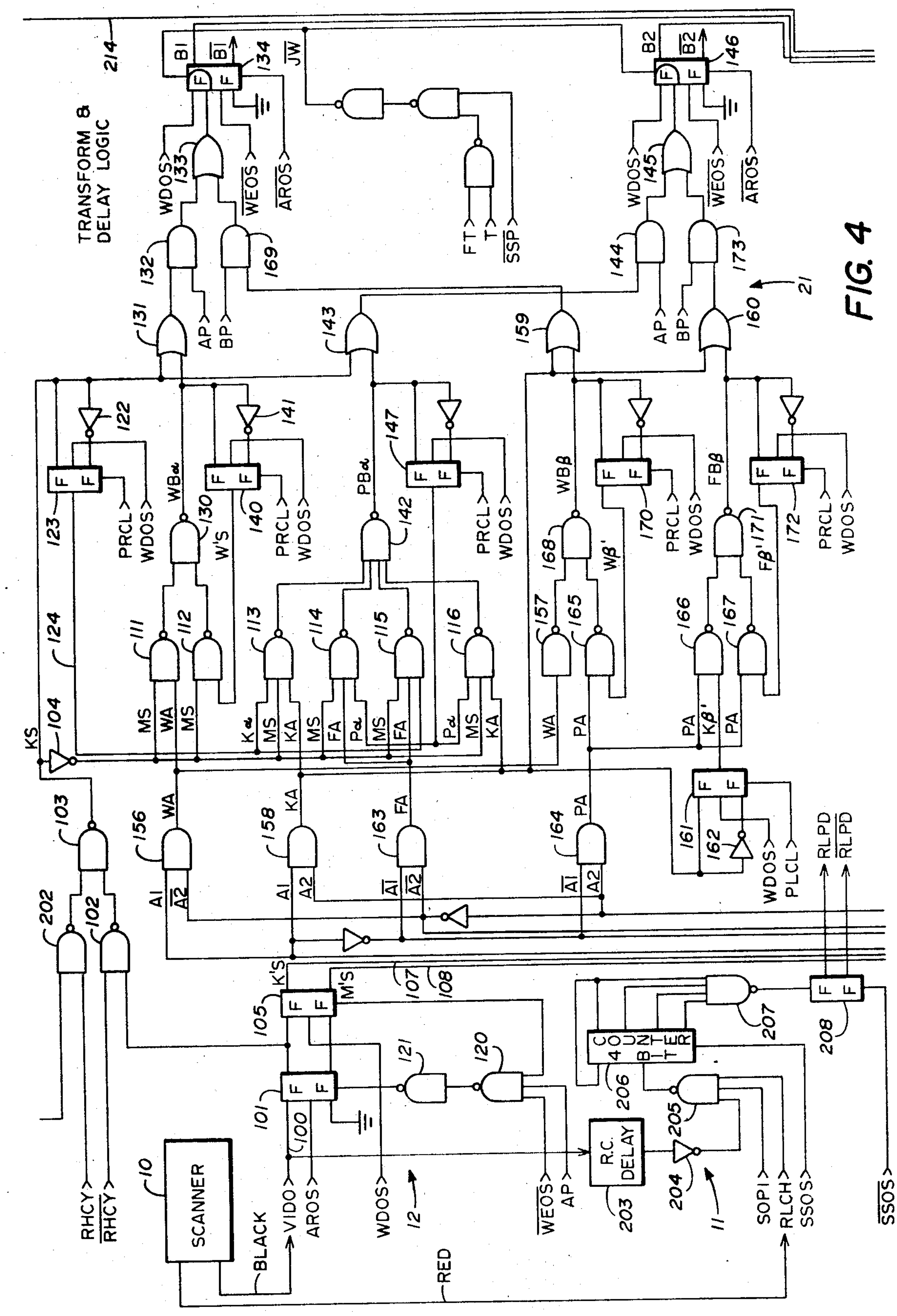
FIGS. 4–11 is a detailed logic diagram of the system of FIG. 1.

FIG. 4 includes a scanner 10, red line detector 11, switch 12, transform unit 21 and control logic from unit 50, FIG. 1, as required therefor. Video signals from the scanner 10 appear on line 100 and are applied to a flip-flop 101 in the switch 12. Flip-flop 101 is a master-slave flip-flop having a timing signal AROS applied to the trigger terminal with the K input terminal connected to ground. Such flip-flop is of the type manufactured and sold by Texas Instruments Incorporated and identified as 7473 Flip-Flop.

AROS signal is derived from a timing unit and is a clock function having pulses of predetermined duration operating to set the output channel of unit 101 true if any black pulse or signal appears on line 100 during the time AROS is applied to flip-flop 101. More particularly, the signal on line 100 may be true or high, representing a black field of view, during the entire interval of the timing pulse. In contrast, a speck of black encountered for a fraction of the timing pulse would produce only a spike on the video line 100. Either case will be effective to cause the output of unit 101 to be true. This action emphasizes any black in the field viewed by the scanner.

The scanner sweeps vertically down the field on which the character reposes, as above discussed in connection with FIG. 2. The AROS signal is repetitive to apply 48 gating pulses per vertical scan. Thus, there are 48 samples of the output signal applied by way of NAND-gates 102 and 103 and inverter 104 to the inputs of each of six NAND-gates 111–116 in transform logic 21. As previously described, transformation and signal handling for the right half of the symbol is carried out differently than for the left hand side. Flip-flop 101 produces a pulse each time a black field is encountered by the scanner. Control signal RHCY enables NAND-gate 102 during the left hand cycle. As a result, the latter pulses are transmitted by gates 102, 103 and inverter 104 to gates 111–116.

A second flip-flop 105 is connected at the output of flip-flop 101 to provide a delayed output and the negation thereof for K's and M's, respectively. Control WDOS is applied to the timing terminal of unit 105. Signals K's and M's are coupled, by way of channels 107 and 108, to a storage unit, FIG. 5, which will later be described. The signals on lines 107 and 108 correspond with the outputs of flip-flop 101 except they are delayed one clock interval. The output of flip-flop 105 is also connected by way of NAND gates 120 and 121 into flip-flop 101 to reset unit 101. Gate 120 has control signals WEOS and AP applied thereto.

The circuit including inverter 122 and flip-flop 123 is provided to apply to line 124 the same input as applied to inverter 104 but delayed one clock pulse. By this means there is applied to the gating logic comprising elements 111–116 the contemporary value of the video output and, selectively, the same output delayed one interval. By this means the contemporary sample may be compared on a selective basis with the value of the sample directly above the contemporary sample in the scan cycle.

In addition to the latter comparison, provision is also made for comparing the contemporary sample with the sample next most remote from the contemporary sample. This involves utilization of the AB register 24, FIG. 5, described below. The transform unit further includes NAND-gates 111 and 112 connected by way of NAND-gate 130, OR-gate 131, AND-gate 132, OR-gate 133 and flip-flop 134 to line B1. Line B1 is connected by way of inverter 135 and NAND-gate 136 (FIG. 5) to the input of each of three active memory elements 137, 138 and 139. Elements 137–139 are 16-bit active element memory units and may be of type SN7484 manufactured and sold by Texas Instruments Incorporated of Dallas, Texas.

The output of NAND-gate 130 is connected directly to the J terminal of a flip-flop 140 and via inverter 141 to the K terminal. The output of unit 140 is connected to the second input of NAND-gate 112. The trigger terminal of unit 140 is connected to WDOS line. The clear terminal is connected to a PRCL line.

Gates 113–116 all have outputs thereof connected by way of NAND gate 142 and OR-gate 143 and AND-gate 144, OR-gate 145 and flip-flop 146 to line B2 which is connected, via inverter 147 and NAND-gate 148 (FIG. 5), to inputs on each of the storage elements 151–153. The output of NAND-gate 103 is connected to OR-gates 131 and 143.

Figure 5:
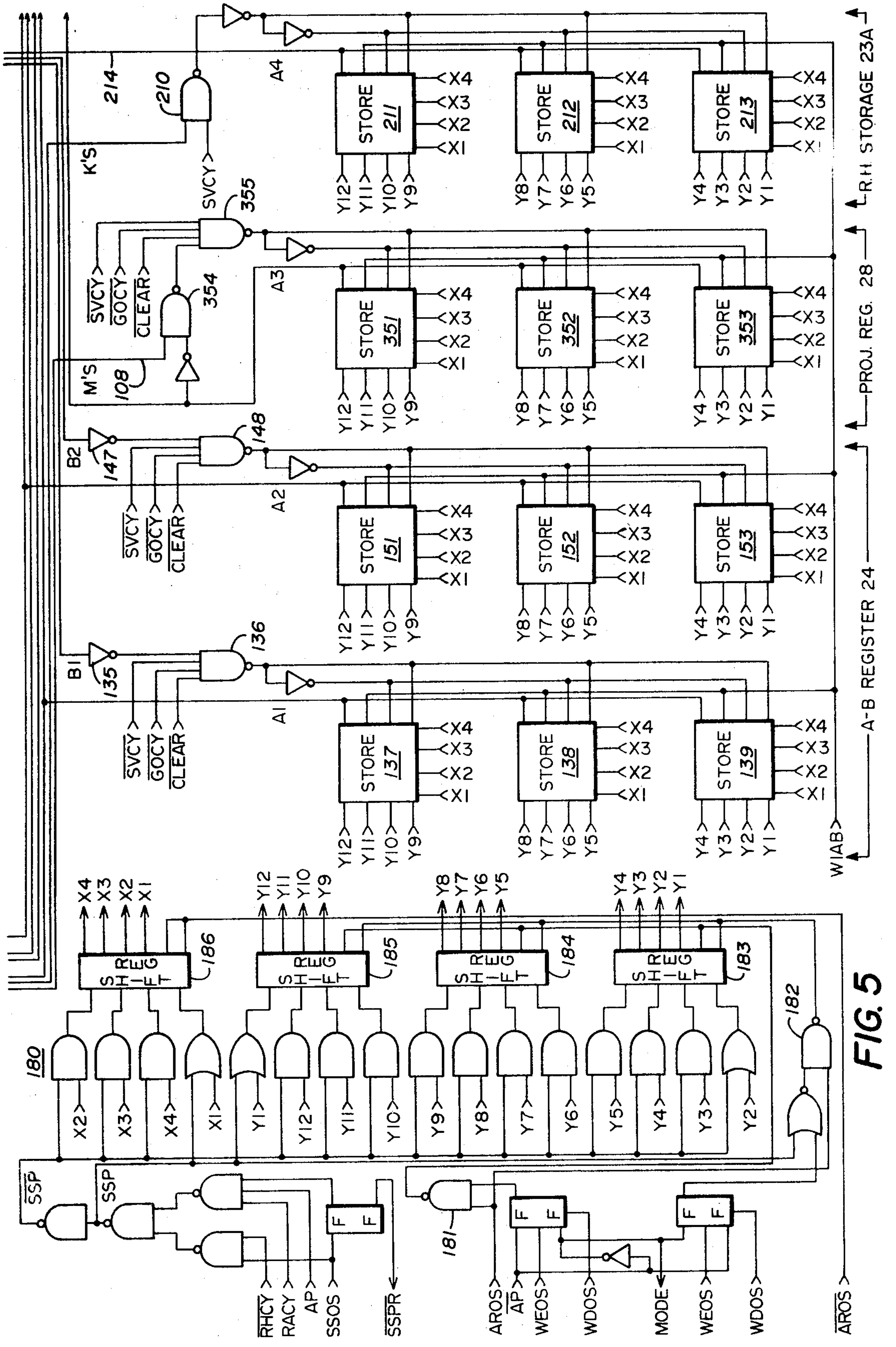

Lines A1 and A2 supply the transformer logic with signals read from AB register 24, FIG. 5. Line A1 is connected by way of AND-gate 156 to one input of NAND-gate 111 and to the input of NAND-gate 157. The line $\overline{A2}$ is also connected to NAND-gate 156.

Lines A1 and A2 are connected to AND-gate 158 whose output is applied as an input to each of NAND-gates 113 and 116 and to the inputs of each of OR-gates 159 and 160. Gate 158 is also connected to the J terminal of a flip-flop 161 and by way of an inverter 162 to the K terminal. The trigger terminal on flip-flop 161 is connected to a WDOS line. Lines $\overline{A1}$ and $\overline{A2}$ are connected to AND-gate 163 whose output is connected to the inputs to each of NAND-gates 114 and 115. Lines $\overline{A1}$ and A2 are also connected to AND-gate 164 whose output is connected to one input of each of NAND-gates 165, 166 and 167. Gates 157 and 165 are connected by way of NAND-gate 168, OR-gate 159, AND-gate 169 to OR-gate 133. The output of NAND-gate 168 is also connected to a flip-flop 170 whose output is connected to the second input of NAND-gate 165. NAND-gates 166 and 167 are connected to NAND-gate 171 and thence to one input of OR-gate 160. The output of gate 171 is also connected to a flip-flop 172 whose output is connected to the second input of NAND-gate 167. OR-gate 160 is connected to AND-gate 173 and thence to OR-gate 145.

As previously noted, one operation is performed during the alpha phase (AP) in which phase the scan is in direction downward from top to bottom. During the beta phase (BP), transformed signals stored in the AB register are scanned bottom to top.

The AP line is connected to gates 132 and 144. The BP line is connected to gates 169 and 173. The flip-flop 134 has WDOS line ANDed within unit 134 with the output of OR-gate 133. Line $\overline{WEOS}$ is connected to the clock input terminal, and the K terminal is connected to ground. Line $\overline{AROS}$ is connected to the clear terminal. The same pattern of connections exists for flip-flop 146.

The transform logic 21 thus far described operates in conjunction with the AB register 24 under the control of a counter system 180, FIG. 5, to generate the two bit code appearing on lines B1 and B2. The latter code represents the condition specified in Table II. In unit 180 it will be noted that the AROS line is connected by way of AND-gates 181 and 182 to two inputs to shift registers 183–185. Line $\overline{AROS}$ is connected to the two inputs of register 186. Registers 183–185 cycle through a 12 count cycle to provide Y address signals for registers 137–139 and 151–153. Counter 186 cycles through a four count cycle to provide second coordinate address signals for the same storage elements.

The output B1, FIG. 4, is stored in memory units 137–139. The output B2 is stored in memory units 151–153. Outputs B1 and B2 are generated during the alpha phase as the scan proceeds downward. Outputs B1 and B2 include transformed signals if any white signal, in accordance with Table II, is preceded by a black signal and if the sample next remote signal is black. Next remote signals are available from memory having been stored during the alpha and beta phases for the preceding scan cycle. Signals representing the next remote samples are applied by way of lines A1, A2, $\overline{A1}$ and $\overline{A2}$ to the transform logic of FIG. 4. Contemporary transformed data represented by B1 and B2 during the alpha phase are then stored in the memory 24 replacing the previously stored data. During the beta phase, the completion of conversion in accordance with Table II is carried out leaving in memory the final states as indicated in Table II. Thus, the alpha phase involves generating and storing a two bit code representative of the comparisons of the preceding point and the point next remote. This two bit code is stored in memory replacing anything previously stored therein. During the beta phase, the data stored in memory is read from memory and applied by lines A1–A2 to the transform logic to change from a "-possible" code to an "enclosed" code for those samples which are enclosed.

The alpha cycle is processed at the same rate as the samples obtained from the channel 100 under control of AROS applied to flip-flop 101. During the beta phase, the clock pulses are applied at a higher rate so that a reverse scan will be completed in the interval between the end of one alpha phase and the start of the next scan. For this purpose, it will be noted that the control for the counter 180 provides for forward and reverse counting so that the count can be in the forward direction during the alpha phase or downward scan and in the reverse direction during the beta phase.

CENTER BAR DETECTION

The system shown in FIGS. 4 and 5 operates serially on data from successive left hand scans by the optical reader until the center bar is detected. During the left hand cycle, the $\overline{RHCY}$ control signal has been applied to the NAND-gate 102. During the right hand cycle, a RHCY signal is applied to NAND-gate 202. This signal is produced in response to the output of detector 11. More particularly, a delay unit 203 is connected at its input to channel 100 and at its output by way of inverter 204, NAND-gate 205 to counter 206. The signal on RED line from scanner 10 is high when a red point is viewed by the scanner. When 16 such points are encountered, the RLPD signal is produced at the output of unit 208 to signify presence of a red line. More particularly, when a count of 16 is reached in counter 206, NAND-gate 207 presets flip-flop 208. The true and false outputs of flip-flop 208 are applied to the control unit 50, FIG. 1, to generate the RHCY pulse for application to NAND-gate 202. The output of the red line channel is applied as a RLCH signal to NAND gate 205 to actuate counter 206 which serves to count the number of times that the output from the main scan photocell appearing on channel 100 and the outputs from the red sensitive phototcell appearing on RLCH are different. When there is a difference for a predetermined number of clock periods such as 16, then NAND-gate 207 sets the flip-flop 208 to produce the RLPD output.

Figure 6:
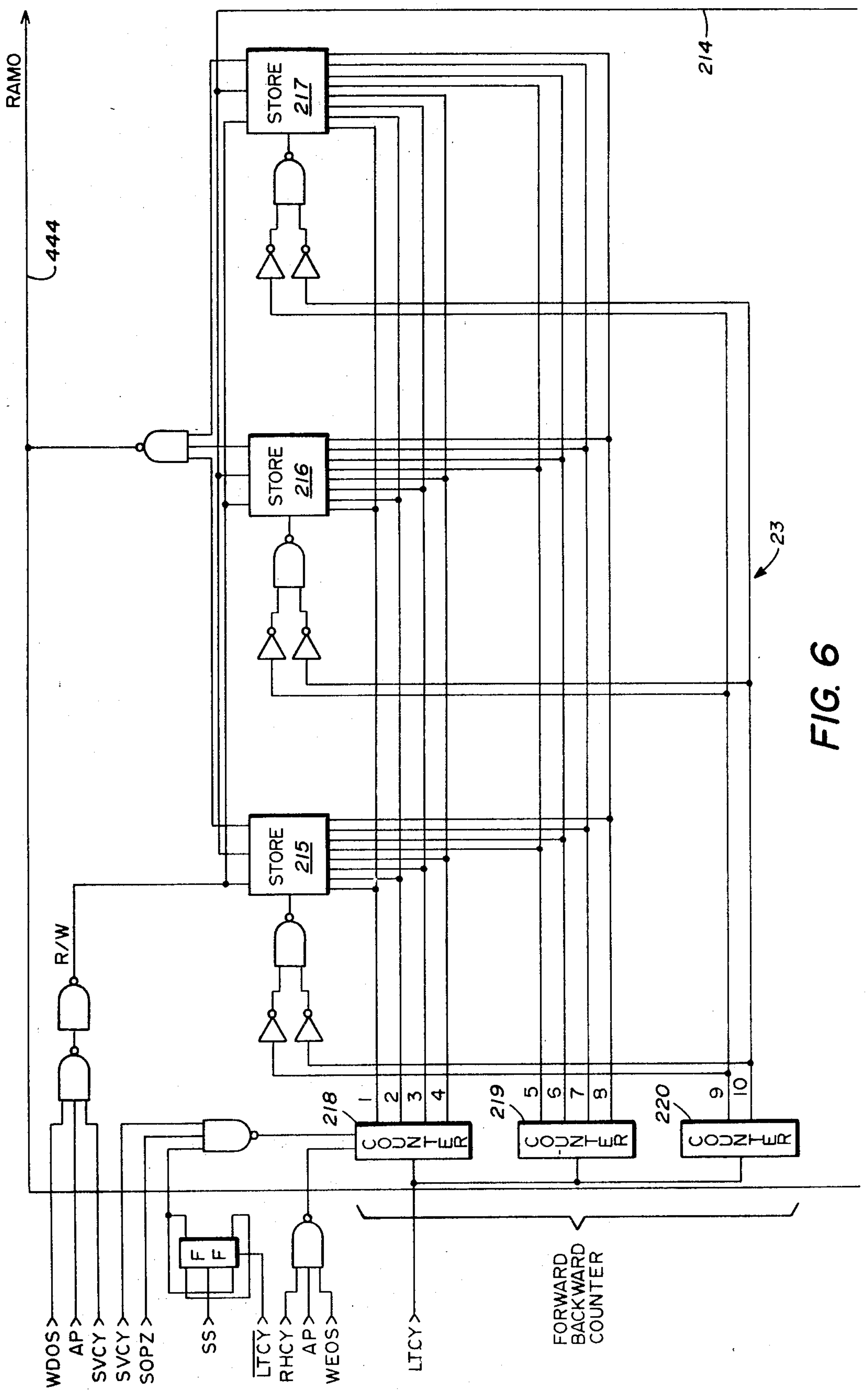

In response to an RLPD signal from flip-flop 208, SVCY (store video cycle) is generated and applied by way of AND gate 210, FIG. 5, along with the output of flip-flop 101 by way of channel 107, but delayed one clock pulse in flip-flop 105. By this means, the data representing the first scan to the right of the center bar is stored temporarily in storage modules 211, 212 and 213. This is a one bit code. After such storage, the data is read from memory 211, 212 and 213 and applied by way of channel 214 to right hand storage unit 23 of FIG. 6. The data from storage units 211–213 is thus transferred to and stored in modules 215, 216 and 217. Each of the latter modules provides for storage of 256 bits. The system of FIG. 6 provides for a temporary storage of all of the necessary data representing the right half of the symbol. During the scan of the right hand side of the character, data is stored in the system of FIG. 6. The stored data is then read from the storage in reverse order and applied to the transform logic 21 of FIG. 4.

The storage locations in modules 215–217 are controlled by a forward-backward counter formed by three four-bit counters 218–220. It will be understood that such data may be stored at sequential storage locations so that all of the data from the right half scan is completed. In order to minimize storage requirements for right hand data, the temporary storage 211–213 is used to combine sets of data from plural right hand scan cycles other than the first scan cycle. More particularly, the first scan data are stored in the first 48 storage locations in unit 215. This set of data is without modification and is passed through intermediate storage in units 211–213. The 48 bits representing the second scan are temporarily stored in memory 211–213. The data for the third scan is then applied to memory 211–213 and effectively ORed, bit by bit, with signals from the second scan. After the third scan, the data in memory 211–213 is transferred to a second set of 48 bit locations in storage element 215. In a similar manner, the fourth and fifth scans are ORed and stored in the right hand storage 23. The sixth and seventh, the eighth and ninth, and subsequent pairs of scans are combined and the resultant is stored until the scan of the right half is completed.

When all right hand scan data are stored in memory 215–217, it is then read by reversing the count of the counters 218–220. The reverse count is at a high clock rate so that the right half data will be processed corresponding to the prior processing of the left half, through the transform logic unit 21 in the interval prior to the start of the left hand cycle for the next symbol.

FIGURE 7

Figure 7:
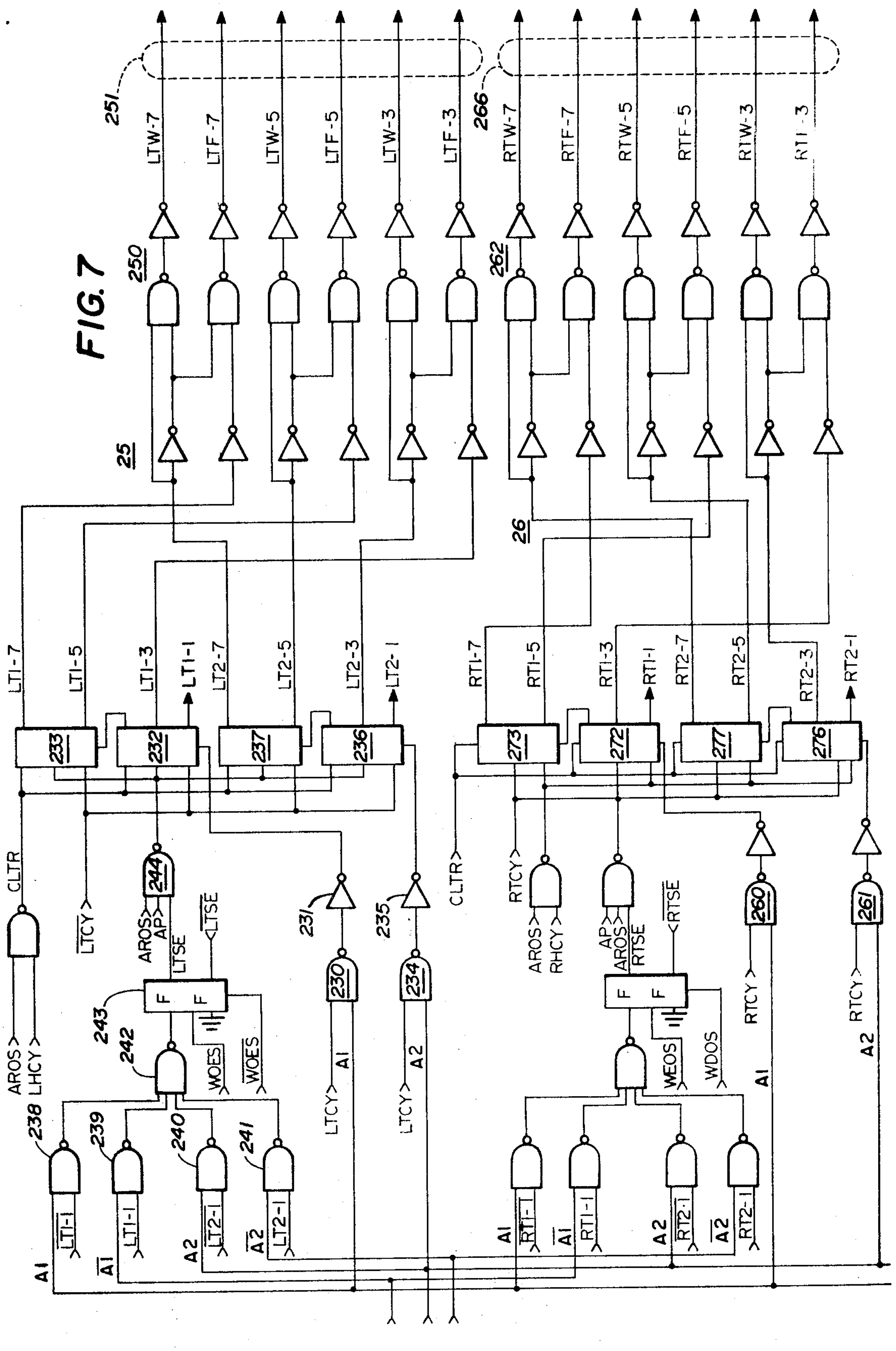

The lines A1, $\overline{A1}$, A2, $\overline{A2}$ extend from FIG. 5 to FIG. 7 and represent the main signal flow to the left topo register 25 and the right topo register 26. More particularly, the left topo cycle (LTCY) begins at the end of RHCY. The 48 bytes whose counter part is column 6, Table VI, are clocked out on lines A1, $\overline{A1}$, A2, $\overline{A2}$ to the left topo register 25 during LTCY. Similarly, at the end of RHCY and during RTCY the 48 bytes, whose counterpart is column 13, Table VI, are clock from memory into right topo register 26. Line A1 is connected by way of NAND-gate 230 and inverter 231 to an input to a register 232 which cooperates with and is connected in tandem with register 233. Registers 232 and 233 are four bit right-shift left-shift registers. They may be of the type manufactured and sold by Texas Instruments Incorporated of Dallas, Texas as Type SN7495N. Line A2 is connected by way of NAND-gate 234 and inverter 235 to a similar pair of shift registers 236 and 237. Line A2 is NANDed with output LT1–1 of register 232 in NAND-gate 238 and line $\overline{A1}$ is NANDed with the same output in gate 239. Line A2 is NANDed with the output LT2–1 of register 236 in gate 240 and line $\overline{A2}$ is also similarly NANDed with the output LT2–1 in gate 241. Gates 238–241 are NANDed in unit 242 whose output is applied to a flip-flop 243. The true output of the flip-flop 243 is the signal LTSE (left topo shift enable) which is applied by way of NAND gate 244 to the input of registers 232, 233, 236 and 237. Registers 232, 233, 236 and 237 serve to detect changes in the status of the left half scan data as collapsed to the center bar and to indicate locations at which changes are encountered. Registers 232 and 233 thus provide indications as to the presence of enclosed areas in the upper left character portion. Registers 236 and 237 indicate the presence of enclosed areas in the lower left character portion. Since registers 232 and 236 each has four outputs, they together provide eight such outputs. All are not used for further processing. In general, only shift register positions 3, 5 and 7 are used inasmuch as they are the locations at which the presence of enclosed areas will be reflected through operation of the topo register logic. Thus, only three selected outputs of gates 232 and 233 are employed, along with three outputs from units 236 and 237, in an encoder 250 to produce on output channels 251 the signals LTF–3, LTW–3, LTF–5, LTW–5, LTF– 7 and LTW–7. It will be remembered that the signals on lines A1 and A2 leading to the left topo register 25 provide a two bit code. The registers 232, 233, 236 and 237 together with the encoder 250 serve to translate the two bit code illustrated in lines *b–e*, Table III into an indication of the presence and absence of enclosed zones. For example, if an enclosed area is in the upper left hand character portion, LTF–7 will be high or at a one state and LTW–7 will be low or zero.

The logic comprising the elements 238–244 serve to shift data upward in registers 232–236 when a change in the collapsed character data is encountered. More particularly, as shown in FIG. 2, the collapse of the numeral 2 to the center bar would result in the detection of seven different zones in data read sequentially from the AB register 24. Such information is continuously present on lines A1–$\overline{A2}$. When the red bar is detected, the AND-gates 230 and 234 are enabled by the presence of the $\overline{LTCY}$ signal thereon. As the two bit bytes appear on lines A1–$\overline{A2}$, the white signals 00 representing the white zone above the upper loop of the numeral 2 are stored, one zero bit being stored in the first stage of shift register 232 and the other zero bit being stored in the first stage of register 236. As additional sets of bits representing white areas are applied to the system, there is no change detected by logic 238–244. Thus, there is no change in the position of the data in the shift registers. However, when the zone representing the black stroke is encountered, a signal 11 appears on lines A1–$\overline{A2}$ representing the black area. This change from what previously had been encountered causes the shift registers to shift the white bits 00 up one position and to enter the code 11 in the first stage of registers 232 and 236. Next encountered in the scan are the white areas below the upper stroke. The change from black to white then causes the energy of a signal 01 in the bottom stage of registers 232 and 236, respectively. Thereafter, the registers remain unchanged until the center crossing of the center bar is encountered. This causes an additional shift and the entry of the black code 11 in the bottom stages. Thereafter, the enclosed code 00 is encountered. This is entered in the bottom stages as the previous data is shifted up. Finally, the lower crossing 11 is registered while causing another shift upward. Finally, the bottom white zone 10 is encountered and entered into the bottom stage of the register.

There are thus seven possible areas to be considered for the numeral 2 and thus the shift registers each has seven used positions. However, it will be recognized that only three of the of the areas are of possible interest in indicating enclosed zones. They are the zones 7, 5 and 3. Thus, lines LT1–7 and LT2–7 are applied to the upper stage of the encoder 250 to provide a true indication on either line LTW–7 or LTF–7, depending upon whether or not the data represented by the two bits in the top level of registers 233 and 237 signify a white not enclosed or a white enclosed zone, respectively. Similarly, the signals LT1–5 and LT2–5 are applied to the second stage of the encoder 250. The signals LT1–3 and LT2–3 are applied to the bottom stage. This completes the left topo cycle.

In a similar manner, signals from the AB register 24 appearing on lines A1–$\overline{A2}$ are applied to the right topo register 26 when the RTCY signals are present to enable the NAND-gates 260 and 261. The same operation is performed in the right top register 26 to provide two bit codes for the output encoder 262 to provide the desired code on the output lines 266. The latter output codes signify the presence of a white area enclosed or a white area not enclosed for each of the three right hand areas of interest as derived from positions 3, 5 and 7 of the shift registers 272, 273, 276 and 277.

Figure 8:
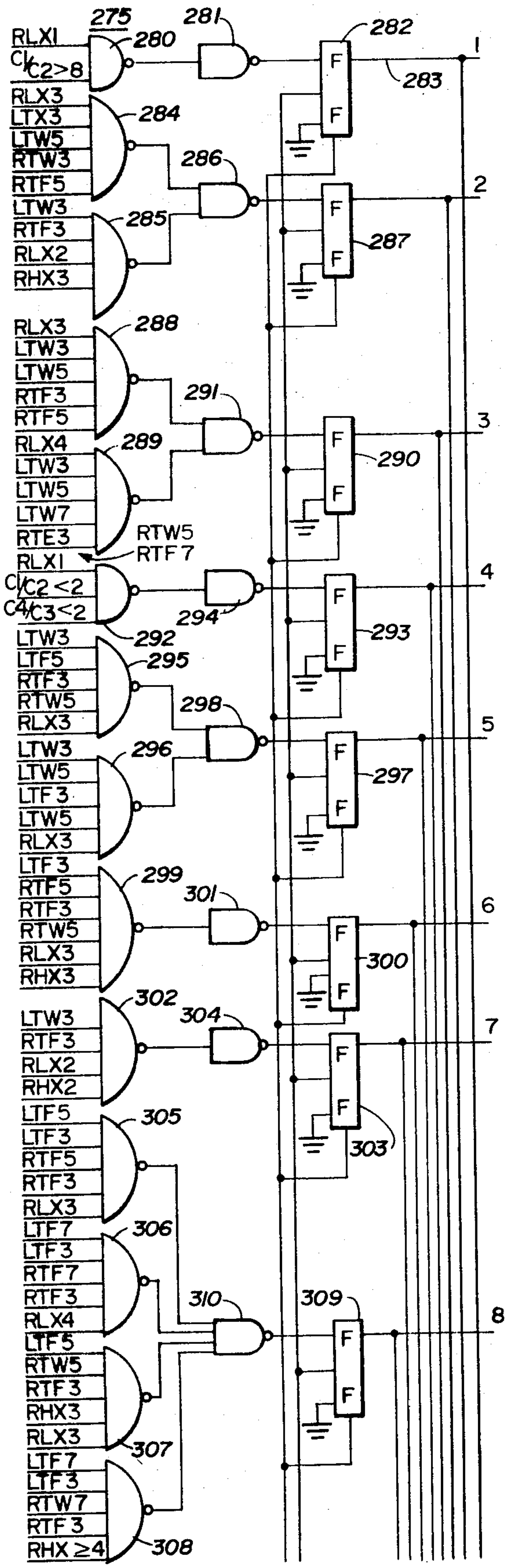
Figure 9:
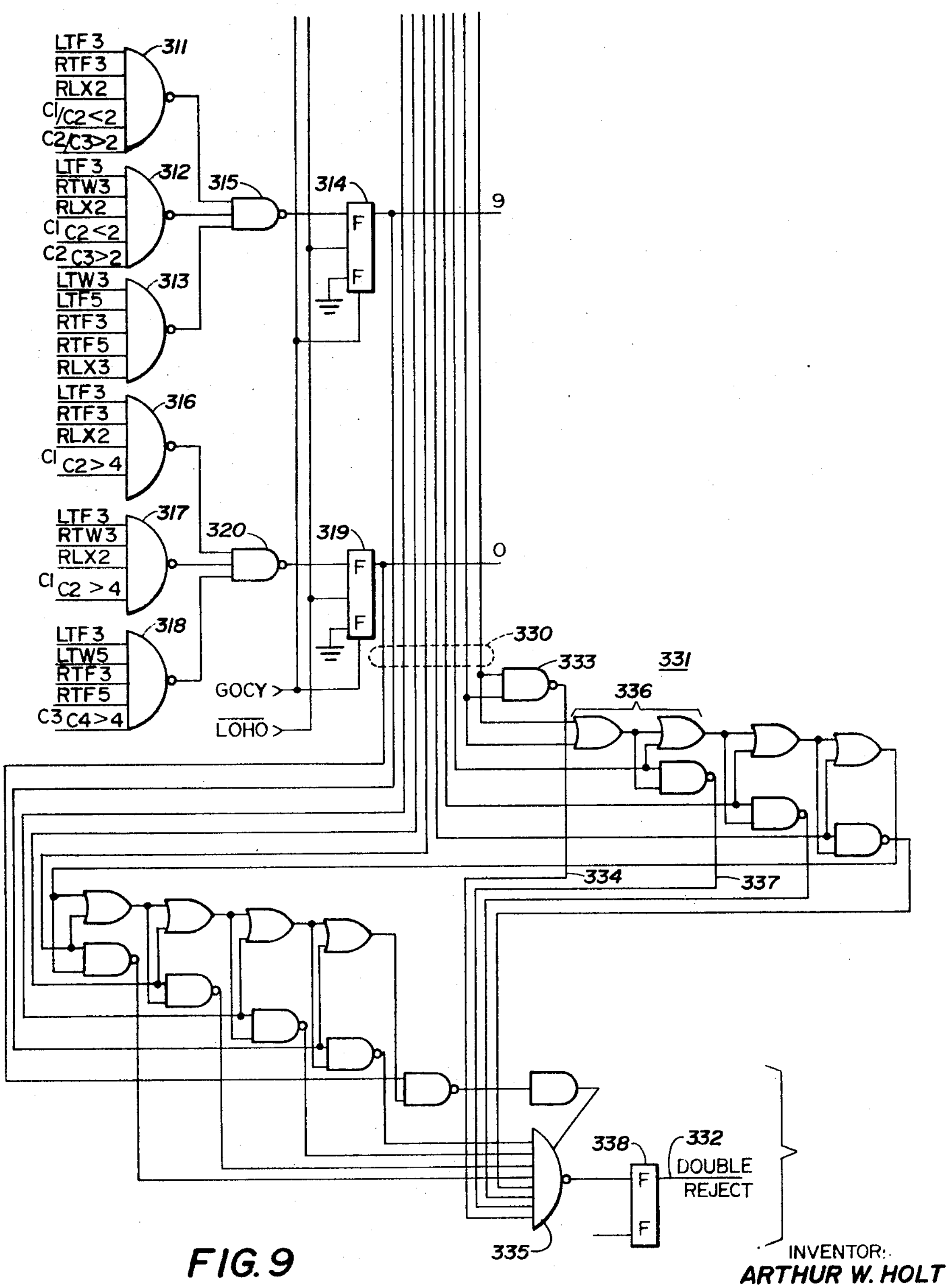

FIGS. 8 and 9

FIGS. 8 and 9 comprise a logical network for providing a contemporary output indicating which character from the set 0–9 was present during the preceding left and right scan cycles. The lines from channels 251 and 266 of FIG. 7 connected in accordance with the legends leading to the left of the numbers of the bank 275 of NAND gates will provide output voltage pulses on one of the output lines 0–9. More particularly, one of the output lines will be energized depending upon which of the numerals 0–9 had just been scanned. The circuit including the decision logic 41 of FIGS. 8 and 9 as thus far described will operate satisfactorily to provide unique output indications so long as the numerals 0–9 are executed within the fields provided and in the manner indicated in FIG. 3. Failure to exercise care in execution requires additional logic which has been included in FIGS. 8 and 9 to employ supplementary input data produced in FIGS. 10 and 11 to eliminate ambiguities that might arise by reason of improper execution. However, before describing the latter refinements, the structure of FIGS. 8 and 9 will be described to illustrate the manner in which the output decisions are made assuming careful proper execution of the symbols 0–9.

In FIGS. 8 and 9, the bank 275 of NAND gates includes NAND-gate 280, which is coupled by way of NAND-gate 281, to a flip-flop 282. Flip-flop 282, when line 283 is true, signifies that the symbol previously scanned was the numeral 1. The flip-flop 282 is of the same type as previously described as involving the master slave operation. In addition to the output of NAND-gate 281, the signal $\overline{\text{LOHO}}$ is applied to the trigger input and the final output cycle signal GOCY is applied to the clear terminal, the K terminal being connected to ground.

In order to provide a reliable desired indication for the numeral 2, there are two NAND-gates 284 and 285 coupled by way of NAND-gate 286 to flip-flop 287. As above described, if the symbols are carefully executed, only one NAND gate would be required as in the case of the numeral 1. The generation of the additional inputs employed in NAND-gates 284 and 285 will be explained in connection with the circuits of FIGS. 10 and 11.

For the symbol 3, two input NAND-gates 288 and 289 feed flip-flop 290 by way of NAND-gate 291.

For the symbol 4, only one NAND-gate 292 feeds flip-flop 293 by way of NAND-gate 294.

For the symbol 5, two NAND-gates 295 and 296 feed flip-flop 297 by way of NAND-gate 298.

For the symbol 6, only a single NAND-gate 299 feeds flip-flop 300 by way of NAND-gate 301.

For the symbol 7, NAND-gate 302 feeds flip-flop 303 by way of NAND-gate 304.

For the symbol 8, four NAND-gates 305–308 feed flip-flop 309 by way of NAND-gate 310.

For the symbol 9, three NAND-gates 311–313 feed flip-flop 314 by way of NAND-gate 315.

For the symbol 0, three NAND-gates 316–318 feed flip-flop 319 by way of NAND-gate 320.

With input signals supplied to the bank of NAND-gates 275 indicated by the legend thereon, a voltage state will be produced on the output lines indicative of the symbol scanned.

Each of the output lines is coupled by way of multichannel bus 330 to a logic network 331 which serves as a doubles detector. An analysis of the circuit 331 will indicate that if more than one of the output lines from the decision logic 41 is true at any one time, a signal is produced on the output channel 332 which indicates presence of an ambiguity. More particularly, if output lines 1 and 2 connected to gate 333 are true, then a false signal on line 334 if applied to NAND-gate 335. Circuit 336 provides that if outputs 1 or 2 and 3 are true, then a false signal appears on line 337. Similarly, the rest of lines 4–9 and 0 are each compared with the preceding outputs and the results of such comparisons are applied to NAND-gate 335. NAND-gate 335 serves to set a flip-flop 338 to energize the output line 332 which in a utilization unit negates use of any output signal on lines 0–9 when more than one line is true.

The output lines 0–9 as well as the doubles reject line 332 of FIGS. 8 and 9 may be connected to any desired utilization device such as a magnetic tape recorder or to suitable storage in a computer. The present invention is concerned with the operation of processing scan data to provide a singular output for each character scanned. The specific manner of utilization of the results of the operation is not part of the present invention.

There are numerous signals employed in the system of FIGS. 5–9 for control purposes as well as signals designated by legends. The timing and control signals will be explained in connection with FIGS. 12–14 in connection with Table VII so that FIGS. 12–14 taken with the construction illustrated in FIGS. 5–9 will provide for operation in which properly executed numerals 0–9 may be automatically identified as they pass the scan station.

As above noted, the system may be further expanded in order to accommodate center justified handprinted characters which do not rigidly comply with a rigid format. For example, numeral 4 executed in the form 410, FIG. 3, will result in a different output code in operation of the system of FIGS. 5–9 than when executed in form 407, FIG. 3. The same is true for the numeral 9 executed in forms 399 and 400, FIG. 3.

In order to provide capability for identification of symbols even though not rigorously executed relative to a standard format but still executed reasonably justified relative to a center bar, three additional sets of information input signals are provided for the output logic of FIGS. 8 and 9.

The first set has to do with a projection onto the center bar of both the right and the left sides of the symbol being scanned and then utilizing such projections to produce ratio outputs which characterize the scanned symbols. This operation involves the use of the projection register 28 of FIG. 5, the projection register output unit 28a of FIG. 11, and the ratio detectors 34 of FIG. 11.

The second set of data involves counting the black crossings, i.e., the number of times the center bar is crossed in execution of the symbol. This information is produced by the logic 27 of FIG. 11.

The third set involves production of a count of the number of like crossings of a vertical line parallel to the center bar but on the right hand side thereof. This operation involves the logic network 35 of FIG. 10.

Figure 11:
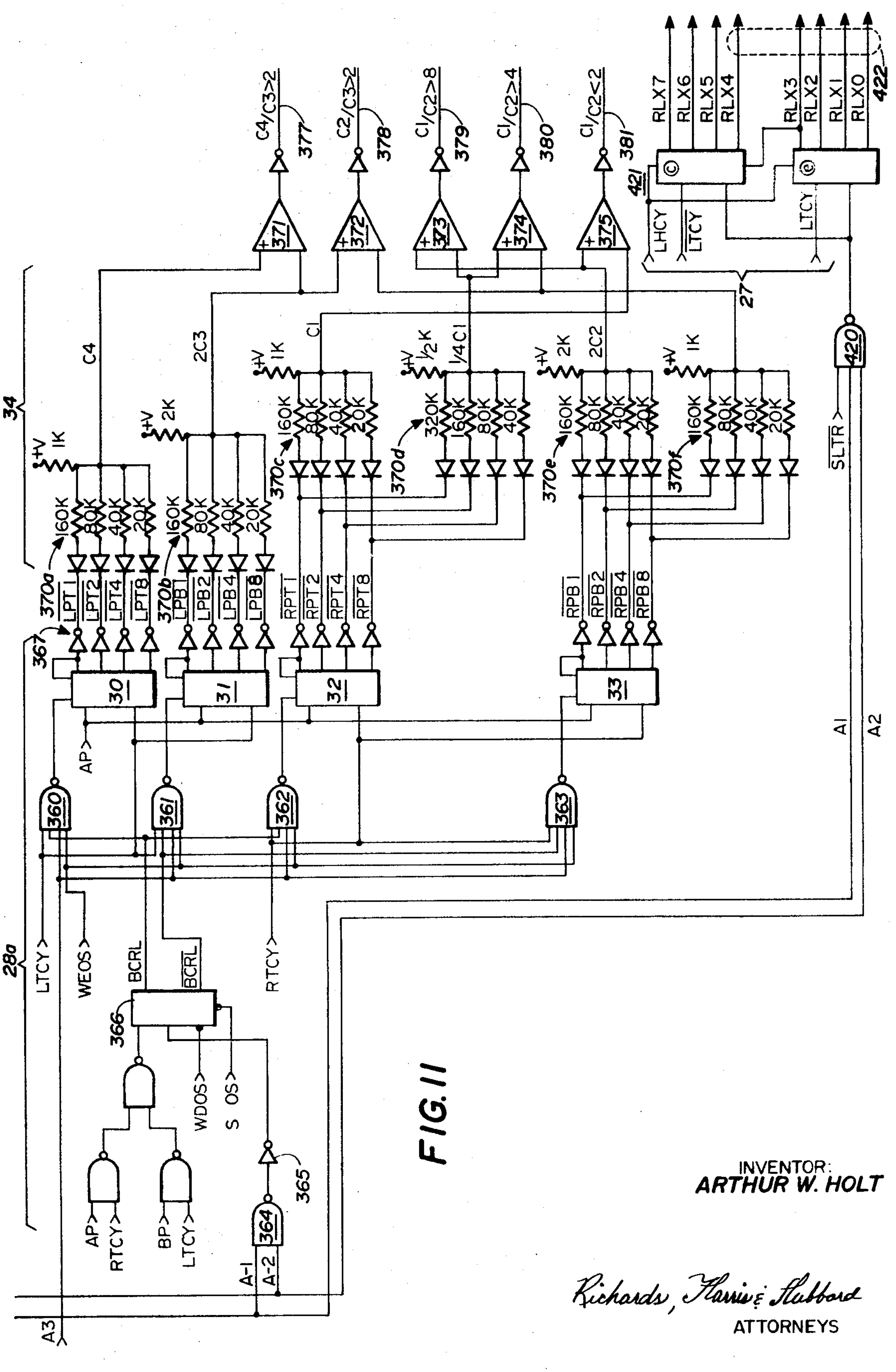

PROJECTIONS—FIGURES 5 and 11

In FIG. 5, a projection register includes three storage elements 351, 352 and 353. They are the same type of active storage arrays as the storage in register 24 and are addressed by the X–Y signals from unit 180. Input signals to the registers are provided by way of line 108 which leads from flip-flop 105 through NAND-gates 354 and 355 to the storage inputs. The input signal on line 108 is the complement of the output of register 101 delayed one clock interval. The data on each scan from the left side is clocked into the 48 storage bits provided by units 351–353 on the first vertical scan of the symbol. Any black sample signal will then be stored as a true value in the storage units 351–353 for the first cycle. On the next cycle, the inputs are also clocked in. The second cycle is effectively ORed in storage, bit by bit, with the previous cycle so that all of the black storage signals in the storage from the first scan will remain black. Any additional black signals picked up during the second scan will be introduced into storage.

As mentioned above, storage units 351–353 are addressed by the output of the counter unit 180 in synchronism with the addressing of the storage units 137–139, 151–153 and 211–213. Thus, as the scanning from the left side progresses to the center bar, there will be progressively added to the storage units 351–353 those signals which represent the black areas encountered during the various scans. As a result, at the end of the left hand cycle, there is a column of black and white signals in storage which indicated the projection from the left of the symbol silhouette onto the center bar. At the end of the left hand scan, signal A3 appears on the output line leading from storage 351–353 and is applied to NAND gates 360–363 in unit 28a, FIG. 11. NAND-gate 360 feeds a counter 30; NAND-gate 361 feeds a counter 31; NAND-gate 362 feeds a counter 30; NAND-gate 363 feeds a counter 33. The signal LTCY is applied to NAND-gates 360 and 361 to enable them during the left hand scan cycle. The control signal RTCY is applied to NAND-gates 362 and 363 to enable them during the right half scan cycle. The current scan signals A1 and A2 are applied by way of NAND-gate 364 and inverter 365 to flip-flop 366 whose true output is connected to NAND-gates 360 and 362. The false output is connected to NAND-gates 361 and 363. Control signal WEOS is also connected to all four NAND-gates 360–363. Control signal LTCY is also connected to counters 30 and 31. Control signal RTCY is connected to counters 32 and 33. The control signal AP is connected to all four counters 30–33. WEOS is a clock signal; AP Is the alpha phase or downward scan portion of each scan cycle. LTCY enables counters 30 and 31 to count the portion of the scan columns in which black is encountered on the left side of the center bar. RTCY enables counters 32 and 33 to count the same for the portion of the symbol on the right hand side of the center bar.

Through the bank of inverters 367, a false output ($\overline{LPT1}$, etc.) for each of the one, two, four and eight bit levels is provided for each of the counters 30–33. The outputs of counter 30 are summed in a weighting resistor network **370*a* and the sum is connected to the plus (+) input of a differential amplifier 371. The amplifier 371 has its minus (−) input connected to the output of a second summing network 370*b* leading from counter 31. Network 370*b* is also connected to the plus terminal of amplifier 372**.

Network **370*c* connects the outputs of counter 32 to the minus terminal of amplifier 375. Network 370*d* connects the outputs of counter 32 to the minus input of amplifier 373 and the plus input of amplifier 374. Network 370*e* connects the outputs of counter 33 to the plus input of amplifier 373 and to the plus input of amplifier 375. Network 370*f* connects the outputs of counter 33 to the minus input terminal of amplifier 372 and to the negative input of amplifier 374. The resistors in networks 370*a*–370*f*** are weighted as shown in Table VIII.

TABLE VIII

| 370a | | 370b | | 370c | | 370e | | 370f | | Value |
|---|---|---|---|---|---|---|---|---|---|---|
| LPT1 | = | LPB1 | = | RPT1 | = | RPB1 | = | RPB1 | = | 160 K |
| LPT2 | = | LPB2 | = | RPT2 | = | RPB2 | = | RPB2 | = | 80 K |
| LPT4 | = | LPB4 | = | RPT4 | = | RPB4 | = | RPB4 | = | 40 K |
| LPT8 | = | LPB8 | = | RPT8 | = | RPB8 | = | RPB8 | = | 20 K |

| 370d | | |
|---|---|---|
| RPT1 | = | 320 |
| RPT2 | = | 160 |
| RPT4 | = | 80 |
| RPT8 | = | 40 |

The outputs of the amplifiers 371–375 are employed in the decision logic 41 of FIGS. 8 and 9 for the purpose of identifying four symbols 1, 4, 9 and 0. The latter symbols are the ones found to be most likely subject to improper execution and which if improperly executed provide ambiguous outputs. The numeral 9, FIG. 3, is executed with the right bar vertical as identified by reference character 400. The bar does not cross the center line as it does in character 399. Immediately below the character 400, the silhouette of the 9 collapsed to the center bar has been illustrated. On the left half scan, the portion above the bottom center line crossing, represented by line 402, is black over the portion of the character height represented by the zone 403. The lower portion of the left side of the center bar designated as zone 404 is all white. In contrast, both the upper and lower portions 405 and 406 encountered during the right half scan are black. Thus, at the end of the left hand scan cycle, the signals stored in the projection register 28 are fed sequentially to counter 31. When the lowermost crossing is encountered, the signals stored in the register 28 are applied to the counter 30. Counters 30 and 31 each has four bit outputs (one, two, four and eight). They thus register the number of cells below the lower crossing that are black (counter 31) and the number of cells above the lower crossing that are black (counter 30). Similarly, at the end of the right half scan cycle, counter 33 counts the number of black cells stored in register 28 as represented by the black section 406 (counter 33) and thereafter, following detection of the bottom crossing of the center line, the counter 32 counts the number of black cells above the bottom crossing line (counter 32). In FIG. 11, zones C1–C4 have been designated. These may be referred to as quadrants but are not really quadrants of the total symbol field, but rather represent the zones to the right and left of the center bar and above and below the lowermost pencil line crossing of the vertical preprinted center line. They have been so labeled for each of the four fields at the bottom of FIG. 3.

The counts for these zones are then applied as weighted input signals to the differential amplifiers 371–375 to provide unique output indications for the various symbols between which confusion may arise by improper execution. For example, on line 377 leading from amplifier 371, the signal is true if the ratio C4/C3 is greater than 2. In a similar manner, the output line 378 is true if the ratio C2/C3 is greater than 2. Line 379 is true if C1/C2 is greater than 8. Line 380 is true is C1/C2 is greater than 4. Line 381 is true if C1/C2 is less than 2.

From the legends present on the input to the bank of NAND-gates 275, FIGS. 8 and 9, it will be noted that the ratios appearing on lines 377–381 are applied only to those channels leading to the circuits used for identification of the symbols 1, 4, 9 and 0. In FIG. 3 the shaded areas for 1, 4, 9 and 0 indicate the availability of additional information upon which one of the four symbols can be differentiated from the other. Note that when the symbol 4 is executed as indicated by reference character 407, then it would have the same codes from Table I as the numeral 1 identified by the reference character 408. The 9 and 0 as executed by representations 400 and 409 would have the same code in Table I. Thus, the need for utilization of the projection registers and the differential amplifiers of FIGS. 5 and 11.

FIGURE 11—RED LINE CROSSING DETECTION

Also shown in FIG. 11 is a black crossing counter 27. Signals A1 and A2 along with the control signal $\overline{SLTR}$ are applied by way of a NAND-gate 420 to a counter 421. Thus, there is provided outputs on the output bus 422 indicating whether zero or up to seven crossings of the center line (bar) have been encountered in the execution of each of the symbols being scanned. The first five members of the bus 422 are connected selectively into the AND gates in the bank 275 (FIGS. 8 and 9) to provide an additional bit of information in the final output decision which is distinctive of the various characters. Note that numeral 1 has one red line crossing, symbols 2, 3, 5, 6, 8 and 9 have three crossings, symbols 4, 7 and 0 have two. However, symbols 3 and 8, if not truly center justified as represented by characters 410 and 412, would have four crossings.

FIGURE 10 — RIGHT HALF CROSSING

Figure 10:
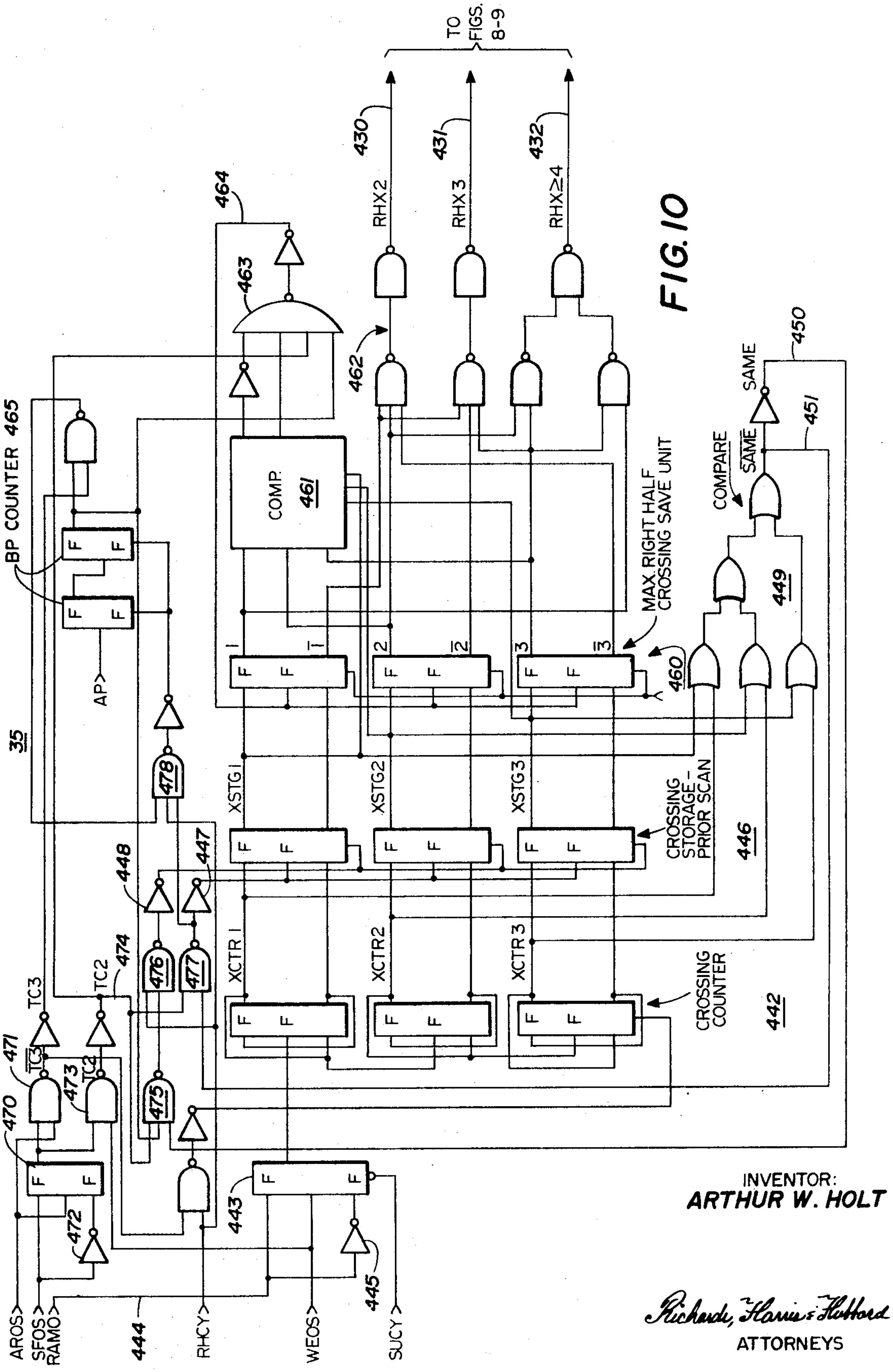

An additional set of information is provided through use of the right half crossing detector 35 shown in FIG. 10. This system has as its information input the RAMO output line leading from the right half memory storage 23 of FIG. 6. The system of FIG. 10 provides an output on line 430 if there are two crossings of any vertical scan path or line located on the right hand side of the center bar. An output is provided on line 431 if there are three crossings of said line. An output is provided on line 432 if the right half crossings of said line equal or exceed four.

For example, in FIG. 3 during the right half scan cycle a vertical scan along dotted line 440 would result in the line 432, FIG. 10, being in a one state since during the scan along the path 440 three crossings of the path by execution of the numeral 3 are encountered. However, along path 444 only two crossings are encountered. The system of FIG. 10 serves to store the maximum number of crossings and to so enable the appropriate one of the output lines 430–432.

The output of the crossing detector represents the maximum number of crossing of vertical scan lines or paths by a horizontal line during any vertical scan in the right half cycle. Spots such as dirt, etc. appearing on the paper will not be interpreted as a crossing. The detector accepts the number of crossings on any scan only if it is the same as the number on an adjacent scan. The accepted number if found valid is compared with any number previously saved as the maximum right hand crossing count, RHX. The larger of the two involved in the comparison is saved and becomes the new RHX for comparison with subsequent scan data in the right half cycle.

In order to carry out the above operation, a crossing counter 442 is employed to count the number of crossings during each current alpha phase of the right half scan cycle. The crossing counter 442 comprises three flip-flops to provide three outputs. The input of the initial stage is supplied by the output of a flip-flop 443 which has WEOS connected to the trigger input. RAMO line 444, leading from the right half storage of FIG. 6, is connected to the set input of flip-flop 443 and, by way of inverter 445, to the reset input. SVCY is applied, by way of a negation, to the clear input of flip-flop 443.

The three output lines from the flip-flops in counter 442 xctr1–XCTR3 are connected to inputs of a crossing storage unit 446 for storing data from a prior scan. Unit 446 comprises three flip-flops having the trigger terminals connected to the output of an inverter 447. The clear terminals of flip-flops in unit 446 are connected to the output of an inverter 448.

The output lines XCTR1–XCTR3 from counter 442 and the outputs XSTG1–XSTG3 from the storage unit 446 are applied to OR gates at the input of a comparator 449. If the contents of counters 442 and 446 are the same, then a signal $\overline{\text{SAME}}$ appears on line 450. If they are not the same, then a signal SAME appears on line 451.

Three flip-flops form a storage unit 460 in which there is stored representations of the maximum number of right half crossings. Both true and false output lines are utilized from each of the flip-flops in storage unit 460. The true outputs are connected to one set of inputs on a comparator 461. At the same time the true outputs XSTG1–XSTG3 are connected as a second set of inputs to comparator 461. The false outputs from storage unit 460 are connected through a logic circuit 462 whose outputs are lines 430–432, only one of which will be true, depending on the maximum number of crossings encountered during the right half cycle.

The output from comparator 461 is applied by way of a circuit including NAND-gate 463 to the trigger input terminals of the flip-flops in storage units 460. If the count stored in storage unit 446 is greater than the count previously stored in storage unit 460, then line 464 is true and thus causes transfer into storage unit 460 of the count in storage unit 446. A BP counter 465, comprising two flip-flops in tandem, is provided to control the timing of the comparisons and utilization of the results of the comparisons. The signal AP is applied to the first of the two flip-flops in counter 465. As will be apparent, during the sequence of timing signals employed in FIG. 10 and illustrated in FIG. 15, the system of FIG. 10 serves to carry out the following functions:

1. During alpha phase (AP): The crossings encountered are counted with the results appearing at the outputs XCRT1–XCRT3 of counter 442.
2. During the beta phase (BP):
   - A. If BP counter 465 < —2, then compare contents of counter 446:
     - i. if the counts are the same clear counter 442;
     - ii. if the counts are not the same:
       - a. transfer the contents of counter 442 to storage 446.
       - b. Clear BP counter 465.
       - c. Clear counter 442.
   - B. If BP counter 465 = 2, then compare the contents of counter 442 with the contents of storage 446:
     - i. if they are the same: compare the contents of storage unit 446 with the contents of storage unit 460.
       - a. If the contents of unit 446 < the contents of storage unit 460, clear counter 442, storage 446 and BP counter 465.
       - b. If the contents of storage unit 446 < the contents of storage unit 460, transfer the contents of unit 446 to storage unit 460, and clear counter 442, storage 446 and BP counter 465.
     - ii. If they are not the same, then transfer contents of counter 442 to storage 446 and clear counter 442 and BP counter 465.

Mathematically the foregoing may be expressed in the form of the following algorithm:

1. During AP: count crossings.
2. During BP: BPGTR < 2:
   compare XCTR with XSTG
   A. Same: clear XCTR
   B. $\overline{\text{Same}}$:
   i. XFLR FM XCTR to XSTG
   ii. Clear BPCTR
   iii. Clear XCTR
   BPCTR = 2:
   compare XSTG with XCTR
   A. SAME: compare XSTG with RHXS
   1. XSTG ≤ RHXS : Clear XSTG, XCTR, BPCTR
   2. XSTG > RHXS : XFER XSTG to RHXS clear BACT, XCTR, XSTG
   B. $\overline{\text{SAME}}$
   X'FER XCTR to XSTS
   clear SXTR, BPCT It will be noted that AROS is applied to an input flip-flop 470 and to gate 471. Signal SFOS is applied to the set terminal of flip-flop 470 and, by way of inverter 472, to the reset terminal thereof. The output of flip-flop 470 is connected to gate 471 and to a gate 473. Gate 473 also has WEOS as an input and provides an output on line 474 which leads to gate 475 to which SAME is applied for energizing, by way of gate 476 during $\overline{\text{RHCY}}$, the line leading from inverter 448. Line 451 on which $\overline{\text{SAME}}$ appears is applied to inverter 447 by way of gate 477. The output of gate 477 is also connected by way of gate 478, along with RHCY to the clear terminals of the flip-flop in counter 465.

With the logic network thus shown and described, the maximum number of right half crossings will be indicated by a state on one of lines 430–432. This voltage is then utilized in the output logic of FIGS. 8 and 9 as indicated by the legend thereon. As shown in FIGS. 8 and 9, lines 430–432 are used in the networks for the numerals 2, 6, 7 and 8.

Figure 12:
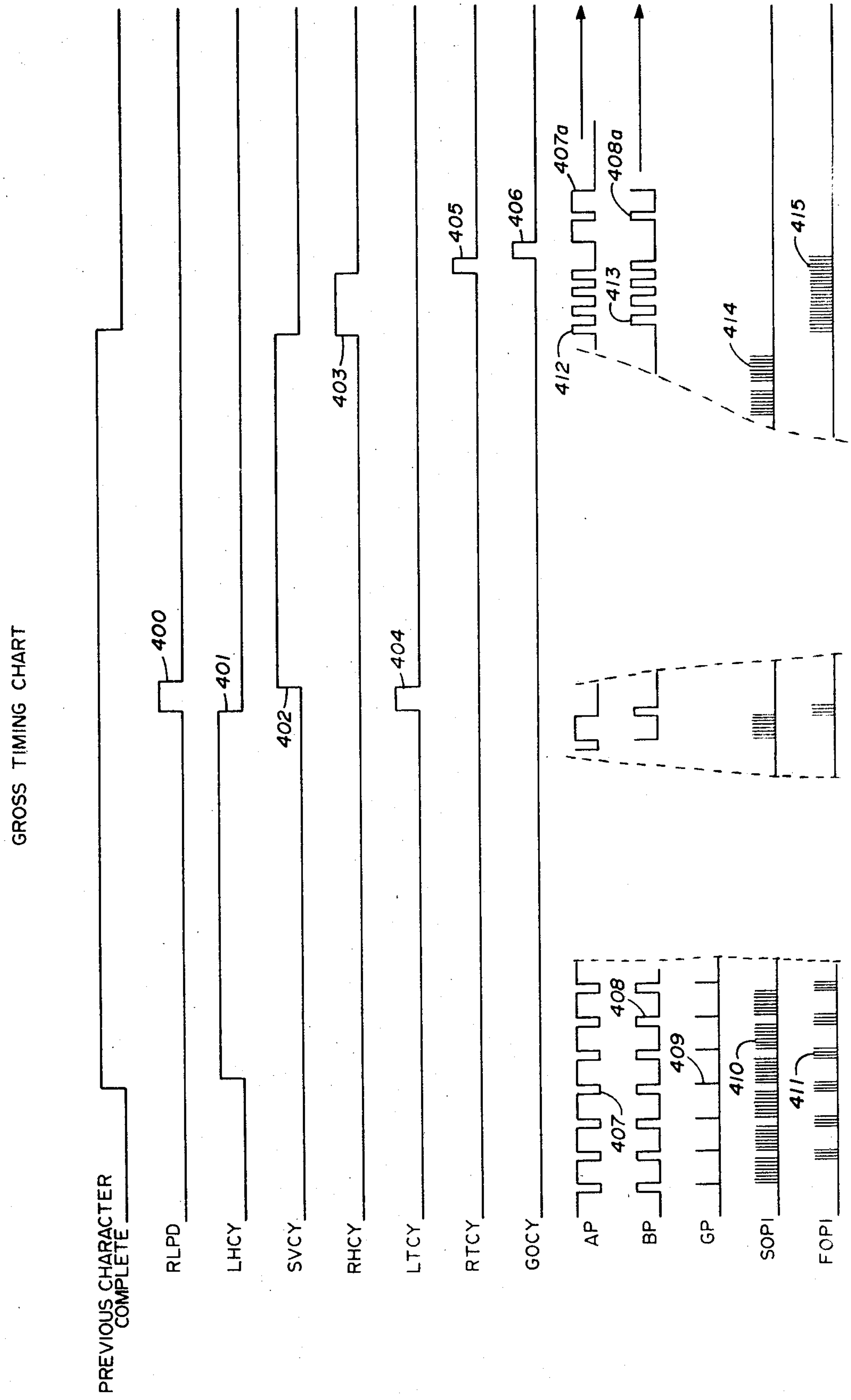
FIGS. 12–14 illustrate time relations of control signals employed in the system of FIGS. 4–11.
Figure 13:
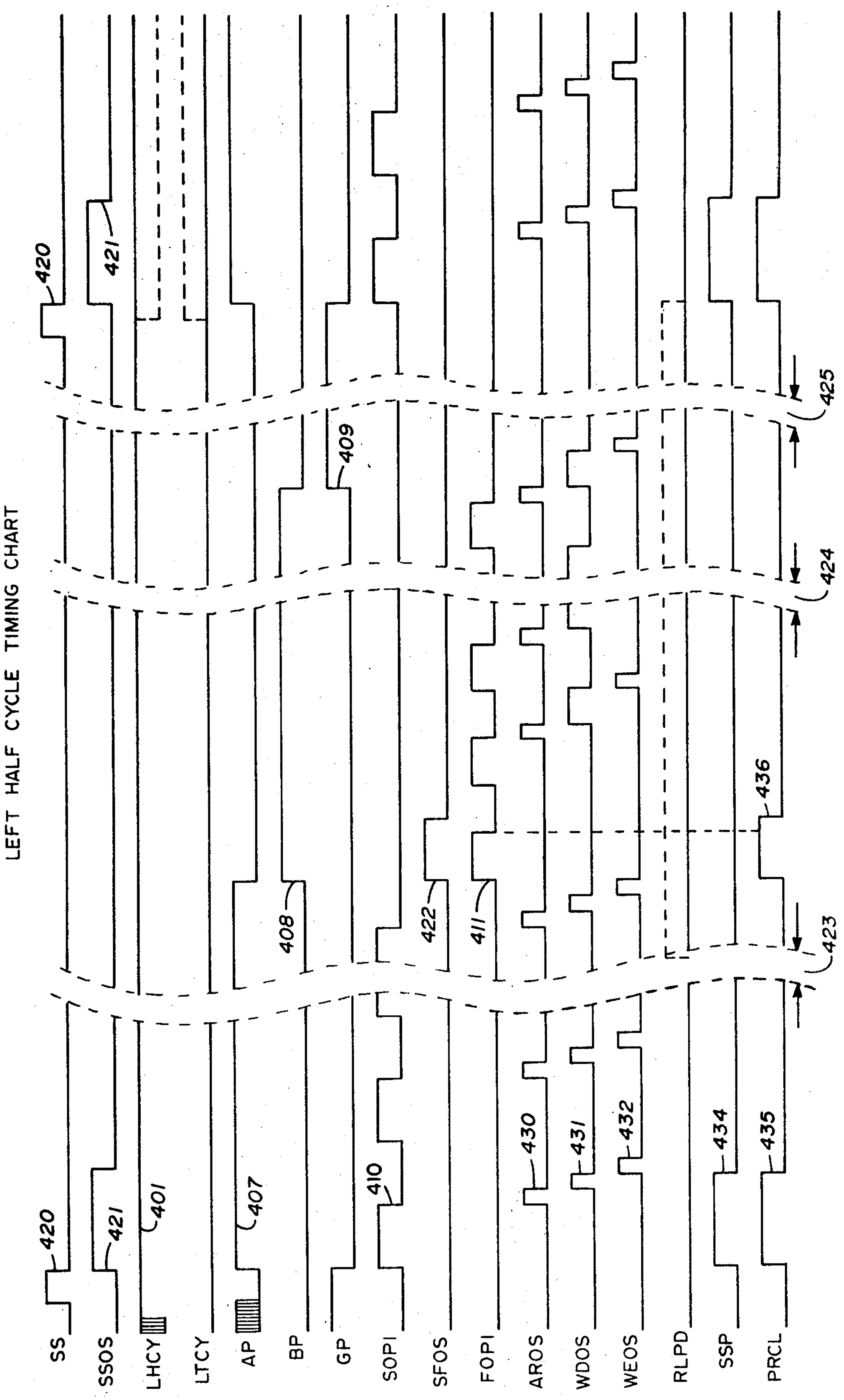
Figure 14:
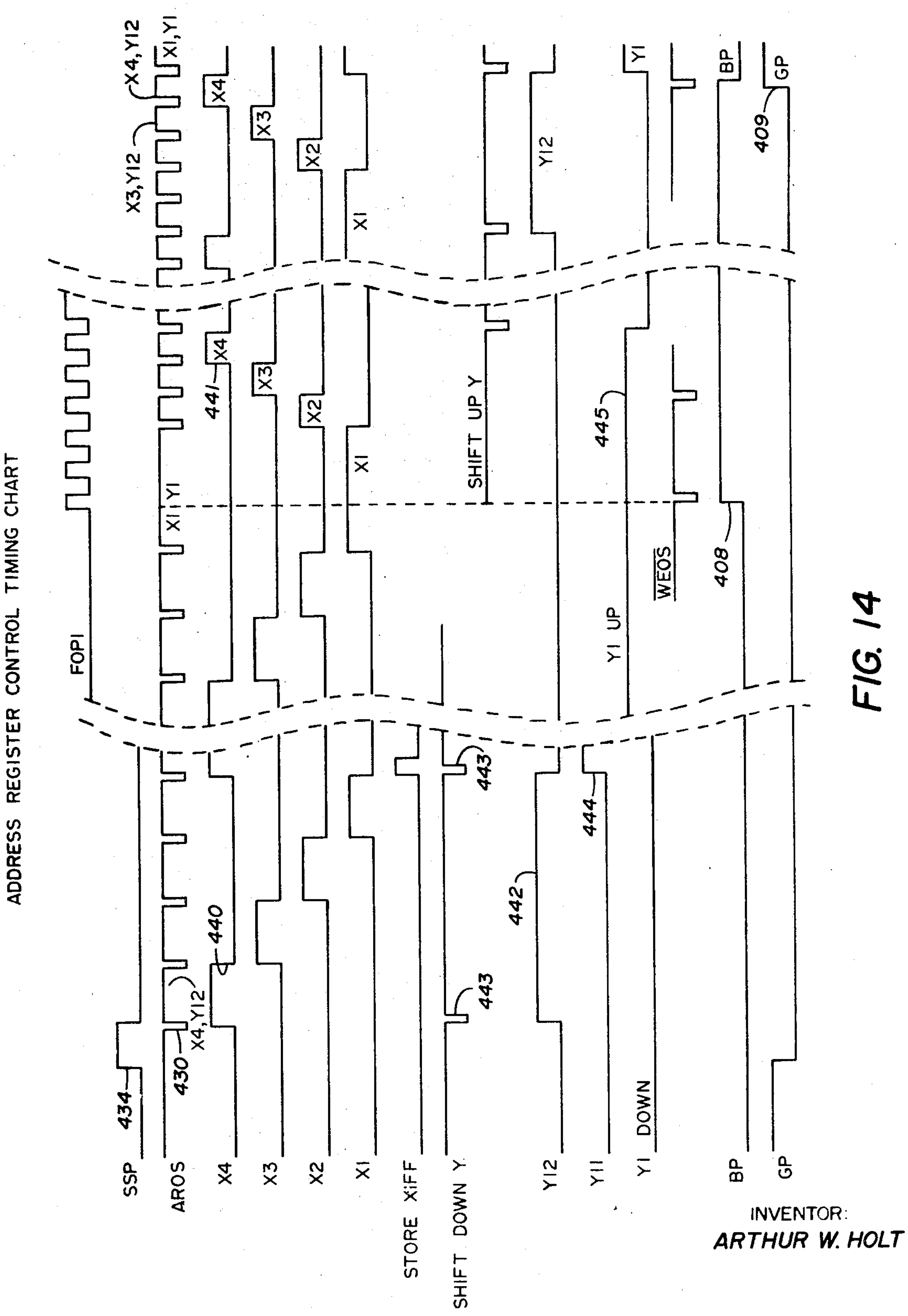

FIGS. 12–14 illustrate timing sequences for the various signals labeled on FIGS. 5–11. Briefly, referring to FIG. 12, the following sequences are employed.

RLPD represents a line upon which a control pulse 400 is generated when the red line detector of the scanning unit encounters or senses the presence of a red line (i.e., vertical bar 13, FIG. 2).

LHCY lines 401 are true during the left half portion of the scan cycle and false during the right half. During the right half portion of the scanning cycle, SVCY lines 402 are true. During the latter time, the data from the right half scan is loaded into the right half memory.

In the interval between the end of the right half of the scanning operation and the beginning of the scanning for the next symbol, the RHCY lines 403 are true. During this time interval, the right hand scan data, stored in right hand memory, is read back into the transform logic and is processed the same as the left hand data except that the operation is carried out at a higher clock rate.

LTCY Line 404 is true beginning immediately after line 401 becomes false and before line 402 becomes true and serves to dump into the left topo register the data in the AB register at the end of LHCY.

In a similar manner, RTCY line 405 is true as RHCY becomes false and serves the same purpose as the true pulse on LTCY line 404 but with respect to the data from the right half cycle. GOCY line 406 is pulsed true to produce a final output reading from the circuit of FIGS. 8 and 9.

It will be remembered that, on each scan during AP of the left hand cycle, the scan output data is read directly into the AB register. The AP pulses are of substantial duration and are spaced by a relatively short interval. In one embodiment, the period of the AP pulse was about 450 microseconds and the intervals between them is about 150 microseconds. Pulses of the 150 microsecond duration formed the true pulses on BP line 408.

At the end of each BP pulse on line 408, a GP line 409 is true. The GP line pulse is of relatively short duration and represents the time interval between the completion of the processing of a beta phase (BP) and the beginning of the next vertical scan of the field on which the symbol reposes.

In order to process the data during each scan, two clock oscillators are employed. The SOP1 line 410 is true, in response to output pulses from the slow oscillator-phase I. The slow oscillator output pulses were of about 4.2 microseconds duration with about 4.2 microsecond spacing between pulses. The FOP1 line 411 is true in response to output pulses from the fast oscillator-phase I. The fast oscillator output pulses were of about 0.5 microsecond duration with about 0.5 microsecond spacing between pulses.

During the downward course of the scanning disk, the SOP1 line pulses are employed to clock the data from the sensor into the transform unit, the latter output being applied to the AB register. Thus, the slow oscillator timing is adequate. However, the processing of the same amount of data, stored in the AB register, must be done in the interval between the end of one scan and the beginning of the next scan. For this purpose, the FOP1 line pulses are employed so that the beta phase can be completed before the initiation of the succeeding alpha phase.

In contrast, data for the right half of the scan cycle is stored in memory. This data must be passed through both the alpha and beta phases in the transform unit and the AB register before beginning of the scan of the next succeeding character. Accordingly, data is gated into the transform unit from the right hand storage at the same rate for both the alpha and beta phases. Thus, AP line 412 carries pulses effective for control of the alpha phase while BP line 413 carries pulses effective for control during the beta phase. Pulses on lines 414 and 415 are used for both the alpha and beta phases and are at the FOP1 rate. After the final output cycle 406, the timing cycle is repeated, clocking data into the transform unit at the scan rate. Thus, pulse sequences **407*a* and 408*a* follow sequence 412 and 413, respectively, beginning at the end of the true state on final output line 406**.

FIG. 13 illustrates timing sequences of various timing signals during the left half cycle.

The time scale in FIG. 13 is considerably expanded compared with the scale of FIG. 12. The line 401 is true throughout the entire length of the left half cycle. The scan begins with a scan start pulse 420. A multivibrator produces an output gate pulse 421 labeled SSOS. In this embodiment, the SSOS pulse 421 was 7 microseconds long. The LTCY line is false throughout the entire left half cycle. The AP line 407 is cycled as shown in FIG. 12 along with the BP line 408. The GP line 409 is true from the end of the pulse on GP line 408 to the beginning of SSODS pulse 421 of the next cycle. The SOP1 pulses 410 are generated during the AP cycle. At the end of the AP cycle, an SFOS pulse 422 is generated which initiates an output from FOP1 during the beta phase. Thus, the interval 423 represents passage of time, not scaled on the time axis of FIG. 13, but occupied by the alpha phase. The interval 424 represents passage of time interval occupied during the beta phase. The interval 425 represents passage of time occupied by the gamma phase.

During the alpha cycle, the trailing edge of the SOP1 pulse 410 serves to initiate generation of AROS pulse 430. The latter pulses follow each of the SOP1 pulses and were 0.2 microsecond in length. The trailing edge of each WDOS signal marks the beginning of a WEOS signal 432, each of 0.5 microsecond in length. The trailing edge of each WDOS signal marks the beginning of a WEOS signal 432, each of 0.1 microsecond in length.

RLPD signifies a line on which the output from a red line detector appears. During the left half cycle, no such signal is encountered. The SSP line carries a pulse 434 which at its onset terminates the GP cycle. The PRCL line pulse 435 is generated beginning coincident with pulse on AP line 407 for the alpha cycle. The pulse 436 on PRCL is generated coincident with the onset of the pulse on line 408 of the beta phase. The PRCL line pulses serve to clear the storage elements in the transform logic.

It will be noted that during the alpha cycle, data is stored in the AB register beginning with at the address X4,Y12 and progressing down to X1,Y1. Thus, the data duly transformed and representing the alpha phase is stored at the 48 addresses in the AB storage register. It will be recalled that after the alpha cycle, the data in the AB register is then again processed in the reverse order in the transform logic. Thus, treatment of the data in the AB register begins at the end of the first FOP1 pulse 411 with the addresses being sequenced in the reverse order, namely from X1,Y1 to X4,Y12, the latter being reached just prior to the beginning of the gamma phase.

FIG. 14 illustrates generation of the address signals for the AB register. The SSP line pulse 434 and the AROS line pulses 430 are shown on the somewhat expanded scale as compared with FIG. 13. The AROS line pulses are applied to the shift registers 183–186 of FIG. 1 so that pulses are produced as illustrated in FIG. 14, namely pulses X1–X4 and Y1–Y11, Y12. During the alpha phase, the X pulses, such as pulse 440, are much longer than the X4 pulse 441 employed during the beta phase. It will be noted that Y12 voltage 442 is true during the alpha cycle pulses X4–X1. Shift down Y pulses 443 are used to shift from Y12 to Y11. The Y11 pulse 444 is turned on when Y12 pulse 442 is turned off. Thus, during the last of the AQ cycle and during the first portion of the BP cycle, the Y1 line 445 is true and goes false coincident with the end of the X4 line pulse 441 during BP 408.

The GP pulse goes true coincident with the leading edge of WEOS pulse that turns off the beta phase. The gamma phase pulse 409 has a duration of the order of 50–60 microseconds while waiting for the next scan to start. Thus, the gamma phase is turned on coincident with the leading edge of that WEOS signal, the trailing edge for which is coincident with the end of the beta phase.

The foregoing description is related primarily to a system in which a disk scanner is employed repeatedly to traverse or scan a bar along the length of a continuously moving document. Disk scanners in general are well known. Representative thereof is the scanner shown in U.S. Pat. No. 3,380,334. In order to utilize the same in connection with the present invention, the light from the scanner is passed through a suitable beam splitter with one path going through a filter to pass red light and the other to pass white light, thereby to separate the character signals from the center bar signals.

It will be further appreciated that the center bar may be of any suitable color optically distinguishable from the character color (black) and white and thus the invention is not limited to the particular colors red, black and white of the embodiment above described.

It will further be apparent that a static sensor may be employed for scanning symbols impressed on moving documents rather than the dynamic system involving a rotating disk. Retinas in optical scanning systems are well known. Such a system is shown in U.S. Pat. No. 3,417,372 to Bieser and in U.S. Pat. 3,484,747 to Nunley. Any single column of photocells in such retina may be employed together with a sequencer, sequentially to scan from top to bottom the fields upon which the characters repose. In such case the sequencing would be done electronically rather than mechanically as in the disk scanner. Thus, the invention is not limited as to the particular form of scanning means but rather involves the method and system for treating signals to identify characters and distinguish characters one from another.

Having described the invention in connection with certain specific embodiments thereof, it is to be understood that further modifications may now suggest themselves to those skilled in the art and it is intended to cover such modifications as fall within the scope of the appended claims.

What is claimed is:

1. In automatic data handling where a character is impressed upon a field having a vertical center bar through the character receiving field, the method which comprises:

a. in an automatic data processing machine sensing said field to generate a character signal dependent upon the projection of said character toward said center bar, b. sensing said center bar to establish a limit on said projection, and c. in response to said character signal, generating in said machine an output signal representative of said character.

2. The method of claim 1 wherein at least two character signals are generated dependent upon projection of different portions of said character to said center bar, and wherein said output signal is dependent upon the ratio of two said character signals.

3. In automatic data handling, the method which comprises:

a. impressing a vertical center bar along the median of a character receiving field on a document, b. impressing on said document an alphanumeric character, center justified with reference to said bar, c. in an automatic data processing machine sensing areas of said field which are enclosed by a continuous boundary formed by a character portion and said center bar both to the right and left of said center bar, and d. generating in said machine a binary digital code representative of the presence and absence of enclosed portions on the right and left sides of said bar for said character containing field.

4. In automatic data handling, the method which comprises:

a. impressing a vertical center bar of a first color extending along the median of each of a plurality of character receiving fields forming a line of fields on a document, b. impressing on said document alphanumeric characters of a second color distinct from said first color, each center justified with reference to one of said bars, c. for each character sensing areas of said field which are enclosed by a continuous boundary formed by a character portion and said center bar in each of upper and lower areas both to the right and left of said center bar, and d. generating a binary digital code representative of the presence and absence of enclosed portions in upper, lower, on the right and left sides of said bar for each of said character containing fields.

5. The method of identifying a character executed substantially in accordance with a predetermined format relative to a vertical center bar extending through a field in which said character responses which comprises:

scanning said character along a plurality of vertically aligned laterally spaced paths, generating white field signals and black field signals representative of white and black fields at each of a plurality of points along each said path, sequentially comparing the signal from each given point with signals representing points immediately above, immediately below and next most remote from said center line to modify said signal from said given point and thereby generate enclosed point signals when any white field is enclosed by black character portions and said center line, and comparing said enclosed point signals for each of a plurality of portions of said field with a code for each symbol to produce symbol identification signals.

6. The method of claim 5 wherein at least some of said characters have said portions four in number, two on the left and two on the right of said bar and wherein two are below and two are above the lowest crossing of said bar by said character.

7. The method according to claim 5 wherein said code and said signals compared therewith are modified in dependence upon the number of crossings of said bar by said character.

8. The method according to claim 5 wherein said code and said signals compared therewith are modified by projection signals dependent upon the projection onto said center bar of the right half and of the left half of each character.

9. The method according to claim 5 wherein said code and said signals compared therewith are modified by projection signals dependent upon the projections onto said center bar of both the right half and the left half of said character.

10. The combination set forth in claim 9 wherein projection signals are representative of the ratio of two separate projections onto said center bar of said character.

11. The method of claim 5 wherein said code and said signals compared therewith are modified in dependence upon the crossing signals representative of the numbers of crossings by said character of a vertical line spaced to one side of said bar.

12. The method according to claim 11 wherein said crossing signals represent the maximum number of crossings by said character of any vertical scan line located on the right side of said bar.

13. A method for recognition of alphanumeric characters which are superimposed upon a vertical character center line where representations of such characters are scanned along a plurality of successive parallel scan lines which repeatedly traverse the character in the same direction along successive lines which are displaced from each other to derive for elemental areas of such scan lines a black signal representative of an element of the character or a white signal representative of an element of the background area for control of character selection, comprising the steps of:

a. transforming a white background signal into a first signal when said element area represents a background area completely enclosed by a boundary formed by a portion of the character and said center line and into a second signal when said element area represents a background area not completely enclosed by said boundary, b. in response to said black signal, said first signal and said second signal generating a code signal representative of the character scanned in dependence upon presence and absence of enclosed areas, and c. decoding said code signal by stored character comparison means for generating an output signal uniquely representative of said character.

14. The method as set forth in claim 13 wherein said code signal is generated in response to the time sequence of transitions between said first and second signals.

15. The method as set forth in claim 13 which further includes generating projection signals representing the horizontal projection onto the character center line of black signal character portions on each side of said center line and utilizing said projection signals in generating said output signal.

16. In data handling where a character is impressed upon a field having a vertical center bar through the character receiving field, the combination which comprises:

a. an automatic data processing machine for scanning said field including means to generate a character signal dependent upon the projection of said character toward said center bar, b. means for sensing said center bar having responsive means to establish a limit on projection, and c. means responsive to said character signal for generating in said machine an output signal representative of said character.

17. The combination set forth in claim 16 wherein means are provided for generating at least two character signals dependent upon projections of different portions of said character to said center bar, and wherein means responsive to the ratio of two said character signals generates said output signal.

18. A system for identifying characters executed substantially in accordance with a predetermined format relative to a vertical center bar extending through a field in which each character reposes which comprises:

a. a first means for scanning said character along a plurality of vertically aligned laterally spaced paths, b. a second means for generating white field signals and black field signals representative of white and black fields at each of a plurality of points along each said path, c. a third means for sequentially comparing the signal from each given point with signals representing points immediately above, immediately below and next most remote from said center line to modify said signal from said given point to generate enclosed point signals when any white field is enclosed by black character portions and said center line, and d. a fourth means for comparing said enclosed point signals for each of a plurality of zones of said field defined vertically by said bar and the sides of said field and horizontally by a horizontal line passing through center bar crossings and by the top and bottom of said field with a code for each symbol to produce symbol identification signals.

19. In a system for automatic recognition of alphanumeric characters which are superimposed upon a vertical character center line where representations of such characters are scanned along a plurality of successive parallel scan lines which repeatedly traverse the character in the same direction along successive lines which are displaced from each other to derive for elemental areas of such scan lines a black signal representative of an element of the character or a white signal representative of an element of the background area for control of character selection, the combination which comprises:

a. means responsive to the derived signals from each elemental area for transforming a white background signal into a first signal when the element area represents a background area completely enclosed by a boundary formed by a portion of the character and said center line and for transforming a white background signal into a second signal when the element area represents a background area not so enclosed,
b. means for generating, in response to said black signal, said first and said second signals, a code of the scanned character dependent upon existence and absence of enclosed areas, and
c. decoder means responsive to said code for producing an output signal uniquely representative of said character.

20. The system of claim 19 wherein the means responsive to the derived signals from each elemental area first includes means to transform each derived signal in accordance with the elemental area signals immediately above and immediately adjacent on one side and second includes means to transform each first transformed signal in accordance with the elemental area signals immediately therebelow.

21. The system of claim 19 wherein the means for generating a code representation includes means for detecting character transitions from said first signal to said second signal and from said second signal to said first signal.

22. The system of claim 21 wherein means are provided sequentially to scan said field by quadrants to generate said code in dependence upon a time sequence of the character transitions.

23. In a system for automatic recognition of alphanumeric characters which are superimposed upon a vertical character center line where representations of such characters are scanned along a plurality of successive parallel scan lines which repeatedly traverse the character in the same direction along successive lines which are displaced from each other to derive for elemental areas of such scan lines a black signal representative of an element of the character or a white signal representative of an element of the background area for control of character selection, the combination which comprises:

a. a first means responsive to the derived signals from each elemental area for transforming a white background signal into a first signal when the element area represents a background area completely enclosed by a boundary formed by a portion of the character and the character center line and for transforming a white background signal into a second signal when the element area represents a background area not so enclosed,
b. a second means for generating, in response to said black signal, said first signal and said second signal, a code of the scanned character dependent upon existence and absence of enclosed areas,
c. a third means for generating in response to said black signals, projection signals dependent upon the horizontal projection onto the character center line of the black points on each side of the character center line, and
d. a fourth means in response to said code and said projection signals for producing an output signal uniquely representative of said character.

24. The system of claim 23 wherein the said third means includes means to generate a plurality of signals representative of the relative magnitudes of the horizontal character projections occurring on each side of the character center line between each character crossing of the character center line.

25. The system of claim 24 wherein means are provided for generating a ratio signal representative of the ratio of the magnitude of one projection signal relative to the magnitude of another projection signal.

* * * * *

PO-1050
(5/69)

UNITED STATES PATENT OFFICE
CERTIFICATE OF CORRECTION

Patent No. 3,651,461 Dated March 21, 1972

Inventor(s) Arthur W. Holt

It is certified that error appears in the above-identified patent and that said Letters Patent are hereby corrected as shown below:

Col 1, line 60, "on" should be --of--.
Col 2, line 60, "sensor" should be --scanner--.
Col 7, line 66, "Stpre" should be --Store--.
Col 8, line 66, "of each" should be --to each--;
line 74, before "WDOS" insert --a--.
Col 9, line 2, "NAND1" should --NAND--;
line 7, "transformer" should be --transform--.
Col 10, lines 4 and 5, "-possible" should be --"possible"--.
Col 11, line 38, "A2" should be --A1--.
Col 12, line 21, "energy" should be --entry--;
line 34, cancel "of the".
Col 14, line 64, "30" should be --32--.
Col 15, line 55, "of" should be --on--.
Col 17, line 12, "xctr1-XCTR3" should be --XCTR1-XCTR3--;
line 20, "SAME" should be --SAME--;
line 22, "SAME" should be --SAME--;
line 52, "465 < -2" should be --465 < 2--;
line 66, "446 <" should be --446 >--.
Col 18, line 35, "for" should be --of--;
line 67, "pulse" should be --pulses--;
line 68, "is" should be --was--.
Col 19, line 33, "sequence" should be --sequences--;
line 47, "SSODS" should be --SSOS--;
line 59, "WDOS" should be --AROS--;
line 60, "WEOS signal 432" should be --WDOS signal 431--.
Col 21, line 41, "responses" should be --reposes--.

Signed and sealed this 1st day of August 1972.

(SEAL)
Attest:

EDWARD M.FLETCHER,JR.
Attesting Officer

ROBERT GOTTSCHALK
Commissioner of Patents